United States Patent
Starhill et al.

(10) Patent No.: US 10,043,309 B2
(45) Date of Patent: Aug. 7, 2018

(54) MAINTAINING CONSISTENT BOUNDARIES IN PARALLEL MESH SIMPLIFICATION

(71) Applicant: Microsoft Technology Licensing, LLC, Redmond, WA (US)

(72) Inventors: Philip Starhill, Lafayette, CO (US); Christopher Messer, Redmond, WA (US); James Undery, Longmont, CO (US); Keith Seifert, Castle Rock, CO (US); David Simons, Louisville, CO (US); Maksim Lepikhin, Boulder, CO (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 26 days.

(21) Appl. No.: 14/967,982

(22) Filed: Dec. 14, 2015

(65) Prior Publication Data

US 2017/0169608 A1    Jun. 15, 2017

(51) Int. Cl.
*G06T 17/20* (2006.01)
*G06T 17/10* (2006.01)
*G06T 15/04* (2011.01)

(52) U.S. Cl.
CPC ............ *G06T 17/205* (2013.01); *G06T 15/04* (2013.01); *G06T 17/10* (2013.01)

(58) Field of Classification Search
CPC ........ G06T 17/20; G06T 15/04; G06T 17/205
See application file for complete search history.

(56) References Cited

U.S. PATENT DOCUMENTS

| | | | |
|---|---|---|---|
| 6,760,023 B2 | 7/2004 | Hubeli et al. | |
| 6,879,324 B1 | 4/2005 | Hoppe | |
| 7,733,338 B2 | 6/2010 | Couture-Gagnon | |
| 8,830,235 B1 | 9/2014 | Guskov et al. | |
| 8,884,955 B1 | 11/2014 | Hsu | |
| 2003/0034970 A1* | 2/2003 | Hubeli .................. | G06T 17/205 345/420 |

(Continued)

OTHER PUBLICATIONS

P. V. Sander, Z. J. Wood, S. J. Gortler and H. Hoppe. "Multi-Chart Geometry Images" Symposium on Geometry Processing Proceedings: Aachen, Germany (2003) Available at: http://works.bepress.com/zwood/1.*

(Continued)

*Primary Examiner* — Zhengxi Liu
*Assistant Examiner* — Raffi Isanians
(74) *Attorney, Agent, or Firm* — Law Offices of Richard Chi; Richard Chi

(57) ABSTRACT

An input mesh can be decomposed into component meshes that can be independently simplified. A computing device can calculate costs of performing candidate edge collapses for a component mesh. The candidate edge collapses can include boundary edge collapses and interior edge collapses. To simplify a component mesh, the execution of boundary edge collapses and the execution of interior edge collapses are interleaved in an order based on the costs of performing the candidate edge collapses. The position of a vertex resulting from a boundary edge collapse can be calculated independently of the interior of the component mesh. When component meshes are simplified in parallel, a boundary that is common to the component meshes can be simplified identically.

19 Claims, 9 Drawing Sheets

(56) References Cited

U.S. PATENT DOCUMENTS

| | | | |
|---|---|---|---|
| 2005/0116950 A1 | 6/2005 | Hoppe | |
| 2010/0277476 A1 | 11/2010 | Johansson et al. | |
| 2013/0300740 A1 | 11/2013 | Snyder et al. | |
| 2013/0314415 A1 | 11/2013 | Schmidt | |
| 2014/0039847 A1* | 2/2014 | Georgescu | G06F 9/4881 703/1 |
| 2014/0368498 A1* | 12/2014 | Wei | G06T 17/205 345/420 |

OTHER PUBLICATIONS

Guangming, et al., "A New Mesh Simplification Algorithm Combining Half-edge Data Structure with Modified Quadric Error Metric", In Proceedings of 16th International Conference on Pattern Recognition, Aug. 11, 2002, 4 pages.

Healey, Christopher G., "3D Modeling and Parallel Mesh Simplification", Published on: Feb. 9, 2012 Available at:<<https://software.intel.comien-us/articles/3d-modeling-and-parallel-mesh-simplification>>, 7 pages.

Akleman, et al., "A Prototype System for Robust, Interactive and User-Friendly Modeling of Orientable 2-Manifold Meshes", In Proceedings of the Shape Modeling International, May 17, 2002, 2 pages.

Hu, et al., "Parallel View-Dependent Refinement of Progressive Meshes", In Proceedings of the Symposium on Interactive 3D Graphics and Games, Feb. 27, 2009, 8 pages.

Hoppe, et al., "Mesh Optimization", In Proceedings of the 20th annual conference on Computer graphics and interactive techniques, Sep. 1, 2014, 8 pages.

Dehne, et al., "Mesh Simplification in Parallel", In Proceedings of 4th International Conference on Algorithms and Architectures for Parallel Processing, Dec. 11, 2000, 11 pages.

Fahn, et al., "Polygonal Mesh Simplification with Face Color and Boundary Edge Preservation Using Quadric Error Metric", In Proceedings of the IEEE Fourth International Symposium on Multimedia Software Engineering, Dec. 11, 2002, 8 pages.

Garland, et al., "Surface Simplification Using Quadric Error Metrics", In Proceedings of the 24th Annual Conference on Computer Graphics and Interactive Techniques, Aug. 8, 1997, pp. 209-216.

Jianhui, Ye, "Region-Based Simplification of Laser Scanned Meshes", In Journal of Graphics Tools, vol. 8, Issue 2, Jan. 6, 2003, pp. 41-50.

Pajarola, et al., "Efficient Implementation of Real-time View-dependent Multiresolution Meshing", In IEEE Transactions on Visualization and Computer Graphics, vol. 10, Issue 3, May 1, 2004, pp. 353-368.

Papageorgiou, et al., "Triangular Mesh Simplification on the GPU", In the Visual Computer, vol. 31, Issue 2, Nov. 4, 2014, pp. 235-244.

"International Search Report & Written Opinion Issued in PCT Patent Application No. PCT/US2016/064511", dated May 12, 2017, 23 Pages.

Soetebier, et al., "Managing Large Progressive Meshes", In Journal of Computers & Graphics, vol. 28, Issue 5, Oct. 31, 2005, pp. 691-701.

Tagliasacchi, et al., "Mean Curvature Skeletons", In Eurographics Symposium on Geometry Processing, vol. 27, Issue 1, Aug. 1, 2012, pp. 1735-1744.

Gueziec, A., "Locally Toleranced Surface Simplification", In IEEE Transactions on Visualization and Computer Graphics, vol. 5, Issue 2, Apr. 1, 1999, pp. 168-189.

Gueziec, et al., "Converting Sets of Polygons to Manifold Surfaces by Cutting and Stitching", In Proceedings of IEEE Visualization, Oct. 24, 1998, pp. 383-390.

* cited by examiner

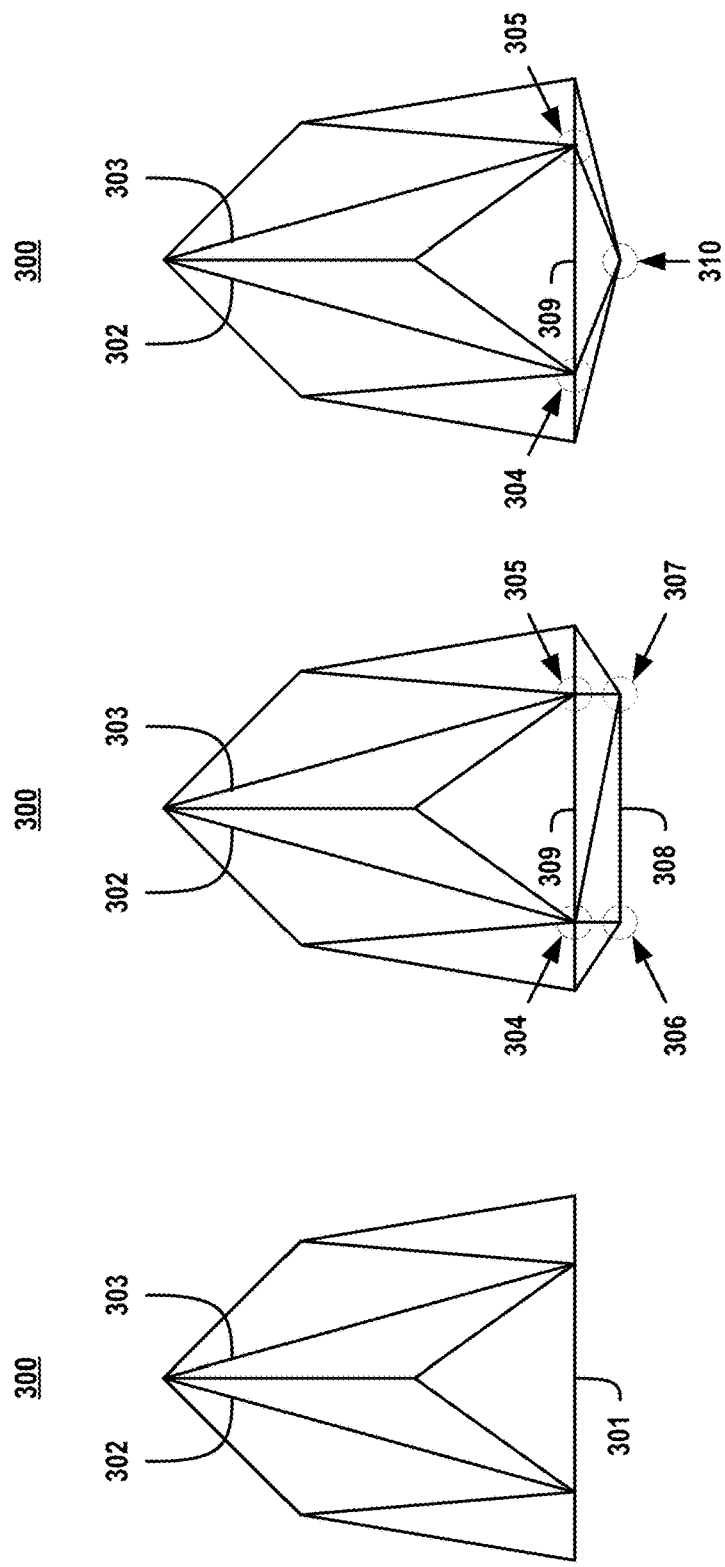

MAINTAINING CONSISTENT BOUNDARIES IN PARALLEL MESH SIMPLIFICATION

BACKGROUND

Computer systems can represent the surface of three-dimensional models using a mesh of triangles. The quantity of triangles within the initial representation of these models makes it necessary to simplify the model through a mesh simplification process. The objective of the mesh simplification process is to produce an output mesh that includes a reduced number of triangles, while retaining the important characteristics of the input mesh. The mesh simplification process can involve vertex decimation, vertex clustering, and performing a series of edge collapse operations. In edge collapse operations, a computer system receives an edge as input and collapses the edge into a single vertex to remove triangles that are incident to the edge.

SUMMARY

The following summary is provided to introduce a selection of concepts in a simplified form that are further described below in the detailed description. This summary is not intended to identify key features or essential features of the claimed subject matter, nor is it intended to be used to limit the scope of the claimed subject matter.

An input mesh can be decomposed into component meshes that can be independently simplified. A computing device can calculate costs of performing candidate edge collapses for a component mesh. The candidate edge collapses can include boundary edge collapses and interior edge collapses. To simplify a component mesh, the execution of boundary edge collapses and the execution of interior edge collapses are interleaved in an order based on the costs of performing the candidate edge collapses. The position of a vertex resulting from a boundary edge collapse can be calculated independently of the interior of the component mesh. When component meshes are simplified in parallel, a boundary that is common to the component meshes can be simplified identically.

These and other features and advantages will be apparent from a reading of the following detailed description and a review of the appended drawings. It is to be understood that the foregoing summary, the following detailed description and the appended drawings are explanatory only and are not restrictive of various aspects as claimed.

BRIEF DESCRIPTION OF THE DRAWINGS

FIG. 3A illustrates a manifold component mesh that would become non-manifold if simplified.

FIG. 3B illustrates insertion of additional geometry into a manifold component mesh to preserve mesh manifoldness.

FIG. 3C illustrates simplification of a manifold component mesh after the insertion of additional geometry.

DETAILED DESCRIPTION

The detailed description provided below in connection with the appended drawings is intended as a description of examples and is not intended to represent the only forms in which the present examples can be constructed or utilized. The description sets forth functions of the examples and sequences of steps for constructing and operating the examples. However, the same or equivalent functions and sequences can be accomplished by different examples.

References to "one embodiment," "an embodiment," "an example embodiment," "one implementation," "an implementation," "one example," "an example" and the like, indicate that the described embodiment, implementation or example can include a particular feature, structure or characteristic, but every embodiment, implementation or example can not necessarily include the particular feature, structure or characteristic. Moreover, such phrases are not necessarily referring to the same embodiment, implementation or example. Further, when a particular feature, structure or characteristic is described in connection with an embodiment, implementation or example, it is to be appreciated that such feature, structure or characteristic can be implemented in connection with other embodiments, implementations or examples whether or not explicitly described.

Numerous specific details are set forth in order to provide a thorough understanding of one or more aspects of the described subject matter. It is to be appreciated, however, that such aspects can be practiced without these specific details. While certain components are shown in block diagram form to describe one or more aspects, it is to be understood that functionality performed by a single component can be performed by multiple components. Similarly, a single component can be configured to perform functionality described as being performed by multiple components.

Various aspects of the subject disclosure are now described in more detail with reference to the drawings, wherein like numerals generally refer to like or corresponding elements throughout. The drawings and detailed description are not intended to limit the claimed subject matter to the particular form described. Rather, the intention is to cover all modifications, equivalents and alternatives falling within the scope of the claimed subject matter. Aspects of the described subject matter can be implemented for and/or by various operating environments, computer networks, platforms, frameworks, computer architectures, and/or computing devices. Aspects of the described subject matter can be implemented by computer-executable instructions that can be executed by one or more computing devices, computer systems, and/or processors.

Figure 1:
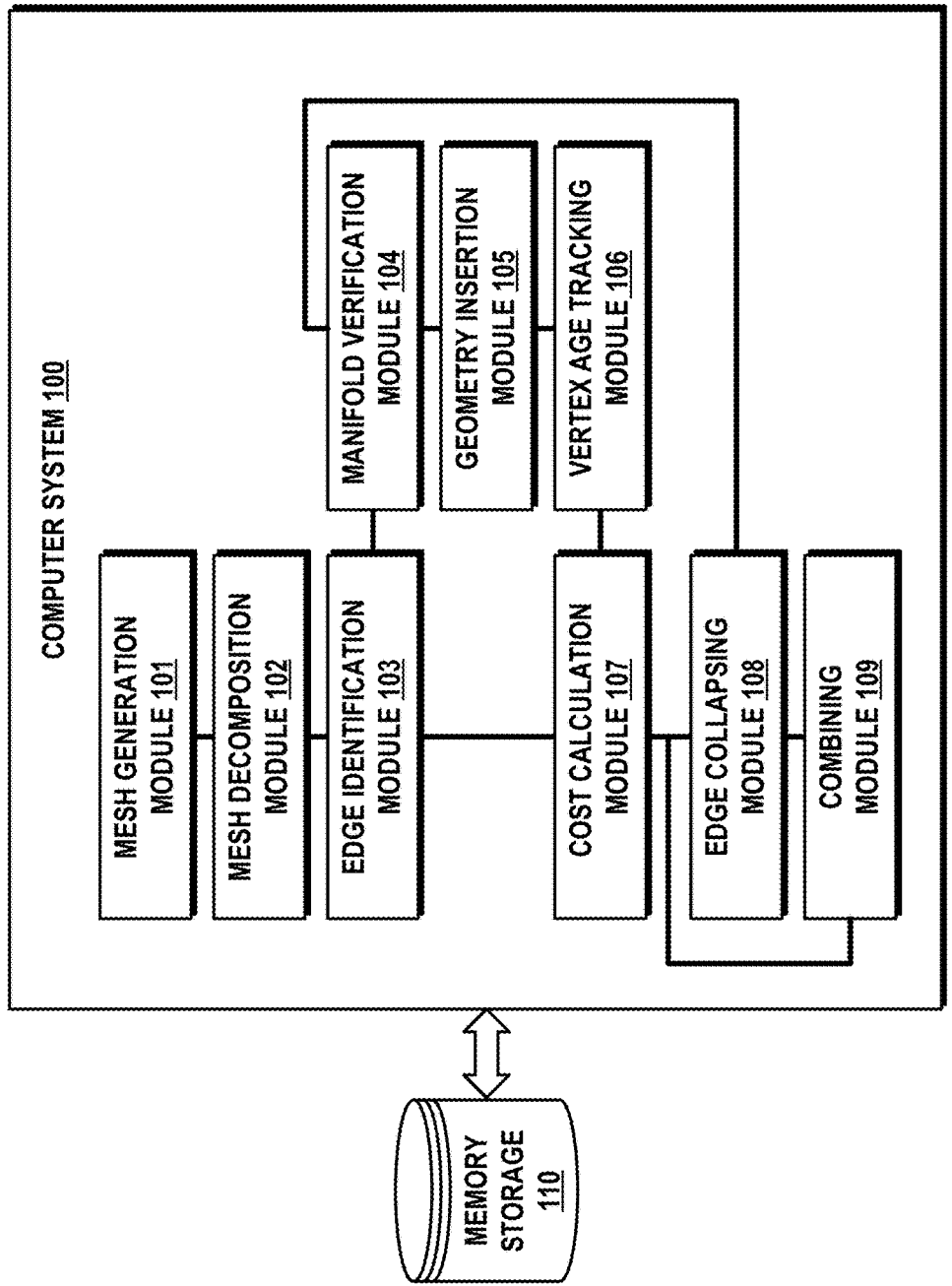
FIG. 1 illustrates an embodiment of an exemplary computer system that can implement aspects of the described subject matter.

FIG. 1 illustrates a computer system 100 as an embodiment of an exemplary computer system that can implement aspects of the described subject matter. It is to be appreciated that computer system 100, or portions thereof, can be implemented by one or more computing devices and can be implemented by software, hardware, firmware, or a combination thereof in various embodiments.

Implementations of computer system 100 are described in the context of one or more computing devices configured to perform various steps, methods, and/or functionality in accordance with aspects of the described subject matter. Computer system 100 and/or a computing device thereof can include a combination of hardware and software. In general, computer system 100 and/or a computing device thereof can include one or more processors and storage devices (e.g., memory and disk drives) as well as various input devices, output devices, communication interfaces, and/or other types of devices. In various implementations, computer system 100 and/or a computing device thereof can include a processor configured to execute computer-executable instructions and a computer-readable storage medium (e.g., memory and/or additional hardware storage) storing computer-executable instructions configured to perform various steps, methods, and/or functionality in accordance with aspects of the described subject matter. It can be appreciated that various types of computer-readable storage media can be part of a computing device and/or computer system. As used herein, the terms "computer-readable storage media" and "computer-readable storage medium" do not mean and unequivocally exclude a propagated signal, a modulated data signal, and/or or a carrier wave.

Computer system 100 can be implemented by one or more computing devices such as server computers configured to provide various types of services and/or data stores in accordance with aspects of the described subject matter. Exemplary server computers can include, without limitation: web servers, front end servers, application servers, database servers (e.g., SQL servers), domain controllers, domain name servers, directory servers, and/or other suitable computers. Computer system 100 can be implemented as a distributed computer system in which components are located on different computing devices that are connected to each other through a network (e.g., wired and/or wireless) and/or other forms of direct and/or indirect connections.

In some implementations, computer system 100 can provide hosted and/or cloud-based services using redundant and geographically dispersed datacenters with each datacenter including an infrastructure of physical servers. For instance, computer system 100 can be implemented by physical servers of a datacenter that provide shared computing and storage resources and that host virtual machines having various roles for performing different tasks in conjunction with providing cloud-based services. Exemplary virtual machine roles can include, without limitation: web server, front end server, application server, database server (e.g., SQL server), domain controller, domain name server, directory server, and/or other suitable machine roles.

Implementations of computer system 100 also are described in the context of "computer-executable instructions" that are executed to perform various steps, methods, and/or functionality in accordance with aspects of the described subject matter. Computer-executable instructions can be embodied and/or implemented in various ways such as by a computer program (e.g., client program and/or server program), a software application (e.g., client application and/or server applications), software code, application code, source code, executable files, executable components, program modules, routines, application programming interfaces (APIs), functions, methods, objects, properties, data structures, data types, and/or the like. Computer-executable instructions can be stored on one or more computer-readable storage media and can be executed by one or more processors, computing devices, and/or computer systems to perform particular tasks or implement particular data types in accordance with aspects of the described subject matter.

Parallel Mesh Simplification

Parallel mesh simplification involves decomposing an input mesh into geometrically separate component meshes, each of which can be simplified to reduce the number of faces or triangles in each component mesh. Simplified component meshes can be reassembled into a combined, simplified mesh. However, a problem occurs when the boundaries of the component meshes are not simplified identically.

One approach to address this problem is to allow the boundaries to simplify differently using standard mesh simplification algorithms and then to apply a post-processing algorithm to reconcile the differences when the component meshes are reassembled. However, such post processing creates major artifacts at the mesh boundaries when the standard mesh simplification algorithms produce very different simplified component meshes.

Another approach involves leaving the boundary of each component mesh unsimplified. However, this approach produces component meshes that include more triangles at the boundary, as compared to the interior. This approach produces artifacts and limits the amount of simplification that can be achieved.

Computer system 100 can include one or more program modules for performing mesh simplification operations in accordance with the described subject matter. Generally, program modules of computer system 100 are implemented as computer-executable instructions, computer programs, computer program components, software code, routines, APIs, functions, methods, objects, data structures, and/or the like, which perform various steps, methods, and/or functionality in accordance with aspects of the described subject matter.

Program modules of computer system 100 can be stored on one or more computer-readable storage media and executed by one or more processors to perform various steps, methods, and/or functionality. Aspects of the described subject matter can be practiced in distributed computing environments where tasks are performed by remote computing devices, or within a cloud of computing devices, that are linked through a communications network. In a distributed computing environment, program modules of computer system 100 can be located in both local and remote computer-readable storage media including memory storage devices.

Program modules of computer system 100 can include a mesh generation module 101, a mesh decomposition module 102, an edge identification module 103, a manifold verification module 104, a geometry insertion module 105, a vertex age tracking module 106, a cost calculation module 107, an edge collapsing module 108, and a combining module 109. While such program modules are shown in block diagram form to describe certain functionality, it is to be understood that the functionality performed by a single program module can be performed by multiple program modules and that a single program module can be configured to perform functionality described as being performed by multiple computer program modules. It is also to be understood that computer system 100 may include some of such program modules, all of such program modules, or additional program modules in various embodiments.

Mesh generation module 101 can be configured and utilized to generate a mesh that represents a three-dimensional model surface. Mesh generation module 101 can produce an input mesh that represents the three-dimensional model surface as polygons (i.e., faces or triangles) interconnected by vertices and edges. Exemplary three-dimensional model surfaces can represent geographic areas and/or various types of objects. In some implementations, mesh generation module 101 can generate an input mesh based on imagery contained in memory storage 110, which is communicatively coupled to computer system 100. The imagery can be taken by cameras at various oblique or nadir perspectives. In the imagery, features can be detected and correlated with one another. These points can be used to determine a stereo mesh from the imagery. In this way, a three-dimensional model surface can be determined from two-dimensional imagery. It can be appreciated that an input mesh can be based on other types of data and that mesh generation module 101 can obtain data from various other sources.

Mesh generation module 101 can store mesh data representing an input mesh in memory storage 110 for retrieval by mesh decomposition module 102 and/or provide the mesh data to mesh decomposition module 102. It is to be appreciated that memory storage 110 can store image data, mesh data, and/or other types of data in accordance with aspects of the described subject matter. It is also to be appreciated that memory storage 110 can be implemented by one or multiple data stores and, in some implementations, can be integrated with computer system 100.

Mesh decomposition module 102 can be configured and utilized to decompose a mesh into a plurality of component meshes. Each component mesh can represents a portion of the three-dimensional model surface as polygons (i.e., faces or triangles) interconnected by vertices and edges. Mesh decomposition module 102 can decompose the input mesh into tiles that are divided by a quadric boundary constraint, such as a boundary plane, with the objective of simplifying each component mesh in parallel. In accordance with aspects of the described subject matter, parallel mesh simplification can produce simplified component meshes that have boundaries that remain within the planes that define the tile boundaries of the decomposed mesh.

Mesh decomposition module 102 can divide the input mesh into geometrically separate component meshes for simplification. Mesh decomposition module 102 can store mesh data representing the component meshes in memory storage 110 for retrieval by various program modules (e.g., edge identification module 103, manifold verification module 104, geometry insertion module 105, vertex age tracking module 106, cost calculation module 107, edge collapsing module 108, etc.) and/or provide the mesh data to such program modules.

Edge identification module 103 can be configured and utilized to determine whether a particular edge of a component mesh is a boundary edge or an interior edge. Each component mesh can include a plurality of interior edges and a plurality of boundary edges. The interior edges are positioned within the interior of the component mesh. The boundary edges are positioned at a boundary (e.g., boundary plane) that separates the component mesh from another component mesh. Depending upon the complexity of the component meshes, parallel mesh simplification can involve performing numerous boundary edge collapses and interior edge collapses on each component mesh.

In accordance with aspects of the described subject matter, component meshes can be simplified in parallel and independently of each other. Separate component meshes can be simplified in parallel with no additional synchronization between component meshes. Decoupling the simplification of each component mesh allows parallel mesh simplification to be performed without the need for back-and-forth communication between processes during the simplification of each component mesh. As a result, parallel mesh simplification operations can be performed on different component meshes at different times and/or on different computers.

In various implementations, a standard mesh simplification algorithm such as the QSlim algorithm can be utilized for interior edge collapses in a component mesh. The standard mesh simplification algorithm can be used to define a point V' as the position of a new vertex that results from the collapse of an interior edge connected by vertices $V_0$ and $V_1$. The position of the new vertex is the point V' that minimizes the expression:

$$D(V',F_1)+D(V',F_2)+ \ldots +D(V',F_n)$$

In this expression, the terms $F_1, F_2, \ldots, F_n$ represent the set of all faces that have $V_0$ or $V_1$ as vertices, and D(V,F) represents the distance from a point V to the plane containing the face F.

When the mesh has a boundary, a conventional approach is to add a term to the summation of the standard mesh simplification algorithm expressing the distance to the boundary with a large weighting coefficient. According to this approach, the position of the new vertex is the point V' that minimizes the expression:

$$D(V',F_1)+D(V',F_2)+ \ldots +D(V',F_n)+ \\ \text{LARGE\_NUMBER}*D(V',P_{boundary})$$

In this expression, the term $P_{boundary}$ is the boundary plane.

However, there are several drawbacks when using this conventional approach for boundary edge collapses. Importantly, the foregoing expression depends on the data on the interior of the component mesh. As a result, adjacent component meshes almost never simplify identically and therefore require post processing to reconcile their differences. Furthermore, if the weight given to the distance term is too large, the problem becomes ill-conditioned, and the solution is therefore numerically unreliable. If the weight given to the distance term is not large enough, the terms expressing distance to the neighboring faces will be significant, and the solution will not lie on the boundary plane.

In accordance with aspects of the described subject matter, boundary edge collapses are computed by a different mechanism from standard edge collapses. In various implementations, a special or non-standard boundary edge collapse function is utilized for mesh simplification. According to this non-standard approach, the position of the new vertex that results from collapsing a boundary edge connected by vertices $V_0$ and $V_1$ is the point V' that minimizes the expression:

$$D(V',P_1)+D(V',P_2)+ \ldots +D(V',P_n)+D(V',P_{boundary})$$

In this expression, the term $P_{boundary}$ is the boundary plane (i.e. a plane formed by a boundary constraint). Edges $E_1, E_2, \ldots E_n$ are boundary edges that have $V_0$ or $V_1$ as a vertex. The terms $P_1$, represent respective planes containing edges $E_1$, respectively, and also containing the vector $N_{boundary}$ that is perpendicular to the plane $P_{boundary}$. The term D(V,P) represents the distance from a point V to a plane P.

This non-standard boundary edge collapse function expresses the boundary constraint as a quadric and excludes face terms to keep results in the boundary plane. Minimizing the non-standard boundary edge collapse function defines the position of the resulting vertex as a point V' that, essentially, is guaranteed to lie on the boundary plane and that is independent of the interior of the component mesh.

The position of the resulting vertex is guaranteed to lie on the boundary plane unless the edges $E_1, E_2, \ldots E_n$ are all numerically collinear, which is an inherent ill-conditioning of the problem that must be addressed by alternative means.

Advantageously, when an input mesh is decomposed into tiles that are divided by planes, the non-standard boundary edge collapse function ensures that the boundaries of the component meshes remain within the planes that define tile boundaries. When performing a boundary edge collapse to simplify a component mesh, the non-standard boundary edge collapse function can be used to compute the position of the resulting vertex such that the new vertex position is almost guaranteed to lie on the boundary plane.

This non-standard boundary edge collapse function is independent of the data on the interior of the component mesh and enables shared boundaries of adjacent component meshes to simplify identically without the need to perform post processing. As a result, this approach can avoid post-processing expenses and can avoid introducing artifacts caused by post processing. This non-standard boundary edge collapse function also avoids the use of a weighting coefficient for the distance to the boundary plane and, therefore, is not prone to the errors that can be encountered when the weighting coefficient is too large or too small.

In accordance with aspects of the described subject matter, the consistency of a boundary shared by adjacent simplified component meshes can be maintained by using only boundary information when simplifying the boundary in each component mesh. For instance, a vertex location resulting from a boundary edge collapse in a component mesh and the connectivity of the boundary can be determined using only boundary information and no interior information. As a result, boundaries of adjacent component meshes that originally match will continue to match after each adjacent component mesh is simplified, without the need to reconcile the boundaries. Further, boundaries shared by adjacent component meshes can be simplified identically without the need to synchronize the component meshes and/or share information between processes during the simplification of each component mesh.

The vertices shared by adjacent component meshes are on boundary edges. The position of a vertex that results from a boundary edge collapse in a component mesh can be determined based on positions of boundary vertices shared with an adjacent component mesh and can be determined independently of the interior edges of the component mesh. Simplifying a boundary edge common to adjacent component meshes can be performed using only information from the boundary between the adjacent component meshes. Consequently, the common boundary edge can be simplified identically in each of the adjacent component meshes.

A component mesh can be adjacent to multiple component meshes. The simplification of a boundary shared by adjacent component meshes can be performed independently of the interior simplification of the adjacent component meshes and independently of the simplification of the other boundaries of the adjacent component meshes. As an example, a component mesh A can be adjacent to component meshes B and C. In this example, component meshes A and B can share one set of boundary edges, and component meshes A and C can share another set of boundary edges. A particular boundary edge shared by component meshes A and B can be simplified based on vertices that form boundary edges shared by component meshes A and B, independently of vertices that form interior edges of component meshes A and B, and independently of vertices that form boundary edges shared by component meshes A and C.

Inserting Geometry to Preserve Mesh Manifoldness and Tracking Vertex Age

Manifold verification module 104 can be utilized to verify that a mesh is manifold and/or that performing a subsequent edge collapsing operation will result in a simplified mesh that is manifold. A mesh that is manifold represents a surface that can be consistently immersed in three-dimensional space. In various implementations, component meshes are required to be manifold and required to remain manifold after simplification. For instance, component meshes and simplified component meshes can be required to topologically represent an orientable 2-manifold with boundary, in which all boundary edges are open edges and all other edges (i.e. interior edges) are closed edges.

A consequence of using only boundary information to perform boundary edge collapses is that sometimes an edge collapse can result in a simplified mesh that is non-manifold. In some situations, performing an edge collapse to simplify a manifold component mesh could result in a simplified component mesh that is non-manifold. For example, performing a particular boundary edge collapse on a manifold component mesh can cause the merging of some interior edges that should remain distinct. A simplified component mesh that is non-manifold is an undesirable and incorrect result. Skipping over such boundary edge collapse, however, will produce adjacent boundaries that do not simplify identically, which is also undesirable.

Therefore, as a preemptive measure, manifold verification module 104 can determine whether a component mesh will become non-manifold in advance of performing an edge collapse. For instance, before a particular edge collapse (e.g., boundary edge collapse or interior edge collapse) is performed to simplify a component mesh, manifold verification module 104 can verify that the particular edge collapse will result in a simplified component mesh that remains manifold.

Manifold verification module 104 can analyze a mesh and/or its data to determine whether the edges and/or faces that can connect any pair of vertices meet certain restrictions or conditions. Mesh data representing the vertices, edges and/or faces of a component mesh during various stages of simplification can be stored in a data structure within memory storage 110. In one exemplary implementation, the vertices for each face of the component mesh are stored in a predetermined winding order such as a counter-clockwise winding order or a clockwise winding order. The order of the vertices expresses directed edges between the vertices. For example, if face F is composed of vertices $(V_0, V_1, V_2)$, then face F has edge $(V_0, V_1)$, edge $(V_1, V_2)$, and edge $(V_2, V_1)$. If face F' is composed of vertices $(V_0, V_2, V_1)$, then face F' has edge $(V_0, V_2)$, edge $(V_2, V_1)$, and edge $(V_1, V_0)$. In this example, the faces F and F' differ only by the order of the vertices, and the edges represented by F' are in the opposite direction from the edges represented by F.

Verification can involve determining whether the mesh is manifold (e.g., an orientable 2-manifold with boundary) and/or whether simplifying the mesh will produce a simplified mesh that is manifold based on the analysis of the edges and/or faces. For example, manifold verification module 104 can confirm that an input mesh has been properly decomposed into component meshes that are manifold. As another example, manifold verification module 104 can analyze a manifold component mesh and/or its data to preemptively determine if the effect of one or more subsequent edge collapses would be a loss of mesh manifoldness and/or to recognize one or more patterns (e.g., certain arrangements of vertices, edges, and/or faces) in a manifold component mesh that, if simplified, will result in the manifold component mesh becoming non-manifold.

Manifold verification module 104 can determine whether a particular edge having vertices $V_0$ and $V_1$ is an open edge by examining the edge(s) and/or face(s) that contain vertices $V_0$ and $V_1$. For the particular edge to be an open edge, the mesh must include only an edge from $V_0$ to $V_1$ or an edge from $V_1$ to $V_0$. That is, there is only one face containing both $V_0$ and $V_1$. If the mesh includes both an edge from $V_0$ to $V_1$ and an edge from $V_1$ to $V_0$, then neither edge can be open.

Manifold verification module 104 can determine whether boundary edges are open edges for an existing component mesh and/or for a simplified component mesh that would result from performing a subsequent edge collapse on the existing component mesh. Manifold verification module 104 can determine whether an existing boundary edge is an open edge and/or whether a boundary edge that would result from performing a subsequent edge collapse would be an open edge.

Manifold verification module 104 can determine whether a particular edge having vertices $V_0$ and $V_1$ is a closed edge by examining the edge(s) and/or face(s) that contain vertices $V_0$ and $V_1$. For the particular edge to be a closed edge, the mesh must include exactly one edge from $V_0$ to $V_1$ and exactly one edge from $V_1$ to $V_0$. That is, there are exactly two faces that contain both $V_0$ and $V_1$, and the two faces have complementary winding order (i.e. the edges represented by one face are in the opposite direction from the edges represented by the other face).

Manifold verification module 104 can determine whether interior edges are closed edges for a component mesh and/or for a simplified component mesh that would result from performing a subsequent edge collapse on a component mesh. Manifold verification module 104 can determine whether an existing interior edge is a closed edge and/or whether an interior edge that would result from performing a subsequent edge collapse would be a closed edge.

To verify that a component mesh is manifold (e.g., an orientable 2-manifold with boundary), manifold verification module 104 can confirm that all boundary edges of the existing mesh are open edges and that all interior edges of the component mesh are closed edges. If any boundary edge of the component mesh is not an open edge or if any interior edge of the component mesh is not a closed edge, manifold verification module 104 can determine that a component mesh is non-manifold.

To verify that a subsequent edge collapse will result in a simplified component mesh that is manifold (e.g., an orientable 2-manifold with boundary), manifold verification module 104 can confirm that all boundary edges of the resulting simplified component mesh would be open edges and that all interior edges of the resulting simplified component mesh would be closed edges. If any boundary edge of the simplified component mesh would not be an open edge or if any interior edge of the simplified component mesh would not be a closed edge, manifold verification module 104 can preemptively determine that a subsequent edge collapse will result in a simplified component mesh that is non-manifold.

Geometry insertion module 105 can be employed when necessary to achieve or preserve mesh manifoldness. For example, manifold verification module 104 could determine that a component mesh is non-manifold (e.g., a boundary edge is not an open edge) or could determine that a subsequent boundary edge collapse, if performed, will produce a simplified component mesh that is non-manifold (e.g., a boundary edge would not be an open edge after the collapse). When it is determined that a component mesh is non-manifold or would become non-manifold as a result of a subsequent edge collapse, geometry insertion module 105 can be utilized to insert additional geometry into the component mesh to achieve and/or preserve mesh manifoldness.

Geometry can be inserted as one or more additional vertices and accompanying triangles that are added to the mesh so that subsequent edge collapsing operations will produce a simplified component mesh that is manifold. In some implementations, the existing vertices of a boundary edge of a component mesh can be cloned, the cloned vertices can be added to the component mesh, and additional triangles can be formed by interconnecting the cloned vertices with each other and with the existing vertices of the boundary edge. Geometry insertion module 105 can add geometry to a component mesh such that the new faces are contained completely within the boundary plane. Typically, the boundary plane is nearly perpendicular to most of the faces in the component mesh that are adjacent to the boundary, so the new faces are nearly at a right angle to their neighboring face.

When geometry is inserted into a component mesh, vertex age tracking module 106 can be utilized to track the ages of the inserted vertices for use in calculating edge collapse costs. At various stages during simplification of a component mesh, manifold verification module 104 can determine that a particular edge collapse will cause the component mesh to become non-manifold, and geometry insertion module 104 can add geometry to preserve mesh manifoldness. Vertex age tracking module 106 can be utilized to assign a weighting factor and/or a label to an inserted vertex that provides an indication of when the inserted vertex was added relative to the original vertices and/or other inserted vertices of the component mesh. It can be appreciated that vertex age tracking module 106 can assign weighting factors to original vertices, inserted vertices, and vertices resulting from edge collapses based on the age of each vertex. In one implementation, the weighting factor assigned to a vertex V is 1.0 if in the original mesh, 0.0 if inserted as an additional vertex, and (age weight $(V_0)$+age weight $(V_1)$)/2 if V is the result of collapsing the vertex pair $V_0$, $V_1$. The weighting factor assigned to an inserted vertex can be used when calculating a cost of collapsing a new edge formed by the inserted vertex.

Calculating Edge Collapse Costs and Interleaving Boundary and Interior Edge Collapses One approach to simplifying adjacent component meshes is to perform all boundary edge collapses first, insert geometry to preserve the manifoldness of the mesh topology, and then perform all interior edge collapses. However, when taking this approach, the added geometry will create a "trench" composed of redundant unnecessary triangles near the component mesh boundaries, which is a highly undesirable artifact. By design, conventional mesh simplification algorithms will not modify a mesh in such a way that right angles are removed since the intent of mesh simplification is to reduce the size of the mesh while retaining the important characteristics of the input mesh. Consequently, simplifying all boundary edges of a component mesh first, inserting geometry as necessary, and then simplifying all interior edges of the component mesh will yield an output mesh with a large number of faces contained in the boundary plane that do not correspond to any feature of the input mesh. This limits the objectives of mesh simplification by containing more faces than necessary and by failing to represent the smoothness of the original input mesh across the component mesh boundary.

Rather than performing boundary simplification first, followed by interior simplification, the execution of the boundary edge collapses is interleaved with the execution of the interior edge collapses. To ensure that the boundary simplification is not affected by the interior simplification, a "dry run" boundary simplification can be performed to determine which boundary edge collapses are to be performed in what order, but without applying changes to the component mesh. The simplification operation can then use the planned boundary edge collapses as input and perform both boundary edge collapses and interior edge collapses in an order determined by the relative costs of the edge collapses.

By executing the boundary edge collapses and interior edge collapses in an interleaved manner based on the costs of the edge collapses, the interior connectivity of the component mesh becomes simpler as the boundary is simplified. As a result, there will be fewer cases in which it is necessary to insert new vertices and faces to preserve the manifold (e.g., orientable 2-manifold with boundary) property of the component mesh. In some scenarios, for instance, collapsing an interior edge before collapsing a boundary edge can avoid a non-manifold result and avoid the need to insert geometry.

In cases where it is necessary to add geometry in order to preserve mesh manifoldness, executing the boundary edge collapses and interior edge collapses in an interleaved fashion advantageously reduces the number of unnecessary triangles or "trench" artifacts and yields smoother combined simplified component meshes around their boundaries. However, while the interleaving of boundary edge collapses and interior edge collapses dramatically reduces the number of faces inserted into a component mesh, it does not eliminate them entirely. To reduce the impact that inserted faces have on the costs of collapsing their neighboring edges, the "age" of the added geometry (e.g., inserted vertices) is tracked, and newer faces are given less consideration when deciding on the next edge collapse to perform. Edges formed from newly added vertices can be collapsed without interference from newly added faces and typically will have lower costs. As a result, edges formed from newly added vertices can be preferentially collapsed before edges formed from original vertices so that the simplified component mesh retains more features of the original mesh.

Cost calculation module 107 can be configured and utilized to assign a cost to collapsing a particular edge of a component mesh. The costs of collapsing interior edges and boundary edges are calculated differently. Cost calculation module 107 can utilize the standard edge collapsing function to determine the costs of collapsing interior edges and can utilize the special or non-standard edge collapsing function to determine the costs of collapsing boundary edges.

In various implementations, a standard mesh simplification algorithm such as the QSlim algorithm can be used for interior edge collapses. For instance, the expression: $D(V',F_1)+D(V',F_2)+\ldots+D(V',F_n)$ can be utilized and/or minimized to calculate a point V' as the position of a new vertex that results from collapsing a particular interior edge connected by vertices $V_0$ and $V_1$. In this expression, the terms $F_1, F_2, \ldots, F_n$ represent the set of all faces that have $V_0$ or $V_1$ as vertices, and D(V,F) represents the distance from a point V to the plane containing the face F.

Cost calculation module 107 can utilize the value of the expression: $D(V',F_1)+D(V',F_2)+\ldots+D(V',F_n)$ at the point V' to calculate the cost of collapsing the particular interior edge. In one implementation, the cost of collapsing the particular interior edge can be the value of the foregoing expression at V' and can be calculated as the sum of the distances from the point V' to each of the faces $F_1, F_2, \ldots F_n$.

In various implementations, a special or non-standard boundary edge collapse function can be used for boundary edge simplification. For instance, the expression: $D(V',P_1)+D(V',P_2)+\ldots+D(V',P_n)+D(V',P_{boundary})$ can be utilized and/or minimized to calculate a point V' as the position of a new vertex that results from collapsing a particular boundary edge connected by vertices $V_0$ and $V_1$. In this expression, the term $P_{boundary}$ is the boundary plane (i.e. a plane formed by a boundary constraint). Edges $E_1, E_2, \ldots E_n$ are boundary edges that have $V_0$ or $V_1$ as a vertex. The terms $P_1, P_2, \ldots P_n$ represent respective planes containing edges $E_1, E_2, \ldots E_n$, respectively, and also containing the vector $N_{boundary}$ that is perpendicular to the plane $P_{boundary}$. The term D(V,P) represents the distance from a point V to a plane P.

Cost calculation module 107 can utilize the value of the expression: $D(V',P_1)+D(V',P_2)+\ldots+D(V',P_n)+D(V',P_{boundary})$ at the point V' to calculate the cost of collapsing a particular boundary edge. In one implementation, the cost of collapsing the particular boundary edge can be the value of the foregoing expression at V' and can be calculated as the sum of the distances from the point V' to each of the planes $P_1, P_2, \ldots P_n$ and to the boundary plane $P_{boundary}$.

When geometry is added by geometry insertion module 105 in order to preserve mesh manifoldness, cost calculation module 107 can take into account the age of each vertex using the weighting factors assigned by vertex age tracking module 106. In one implementation, the weighting factor assigned to a vertex V is 1.0 if in the original mesh, 0.0 if inserted as an additional vertex, and (age weight ($V_0$)+age weight ($V_1$))/2 if V is the result of collapsing the vertex pair $V_0, V_1$.

Cost calculation module 107 can modify the cost calculation for interior edge collapses to take into account the age of inserted geometry as follows:

$$\mathrm{Age}(F_1)*D(V',F_1)+\mathrm{Age}(F_2)*D(V',F_2)+\ldots+\mathrm{Age}(F_n)*D(V',F_n)$$

In this modified cost calculation, Age(F) is in the range of 0.0 to 1.0 and is defined as the average weight of the vertices of the face F. The cost of collapsing a particular interior edge can be calculated as the sum of the weighted distances from the point V' to each of the faces $F_1, F_2, \ldots F_n$.

Cost calculation module 107 can modify the cost calculation for boundary edge collapses to take into account the age of inserted geometry as follows:

$$\mathrm{Age}(P_1)*D(V',P_1)+\ldots+\mathrm{Age}(P_n)*D(V',P_n)+D(V',P_{boundary})$$

In this modified cost calculation, Age(P) is in the range of 0.0 to 1.0 and is defined as the average weight of the vertices of the plane P. The cost of collapsing a particular boundary edge can be calculated as the sum of the weighted distances from the point V' to each of the planes $P_1 \ldots P_n$ and the distance to the boundary plane $P_{boundary}$.

These modified cost calculations allow edges involving newly added vertices to be collapsed without interference from the newly added faces. Collapsing edges with inserted vertices will have lower costs than collapsing edges with original vertices so that edges with inserted vertices will be collapsed earlier during simplification of the component mesh.

Cost calculation module 107 can determine and output candidate edge collapses together with their associated costs. The candidate edge collapses can include a plurality of boundary edge collapses and a plurality of interior edge collapses. In some implementations, cost calculation module 107 can calculate the costs associated with boundary edge collapses before calculating the costs associated with interior edge collapses. However, since boundary edge collapses and interior edge collapses are interleaved, cost calculation module 107 can calculate the costs associated with boundary edge collapses and interior boundary edge collapses in any order.

For a component mesh, cost calculation module 107 can calculate the costs associated with all possible edge collapses, the costs associated with a subset of all possible edge collapses, and/or the costs associated with edges that have been formed as a result of earlier edge collapse operations. Cost calculation module 107 can order or rank candidate edge collapses (e.g., boundary edge collapses and interior edge collapses) by their associated costs. At various stages during mesh simplification, cost calculation module 107 can update the possible remaining candidate edge collapses and their associated costs. The output from cost calculation module 107 can be maintained in a data structure within memory storage 110 for retrieval by edge collapsing module 108 and/or provided directly to edge collapsing module 108.

Edge collapsing module 108 can simplify a component mesh by reducing the number of faces, edges, and vertices contained in the component mesh. Edge collapsing module 108 can simplify a component mesh by performing both boundary edge collapses and interior edge collapses. Edge collapsing module 108 performs edge collapses to collapse the two vertices of a particular edge into a single resulting vertex.

Edge collapsing module 108 can employ a mesh simplification technique that involves selecting and/or performing candidate edge collapses for a component mesh in an order based upon their relative costs with respect to one another. To simplify a component mesh, edge collapsing module 108 can select the next edge collapse to perform based on the relative costs associated with the candidate edge collapses. For instance, at each step of the mesh simplification process, edge collapsing module 108 can select the candidate edge collapse (i.e. boundary edge collapse or interior edge collapse) having the lowest cost. As a result, boundary edge collapses and interior edge collapses can be performed in an order such as from lowest cost to highest cost based on the calculated costs of performing the candidate edge collapses.

Prior to performing a selected edge collapse (e.g., the candidate edge collapse having the lowest cost), edge collapsing module 108 can communicate (e.g., query, request, etc.) with manifold verification module 104 to confirm that the selected edge collapse, if performed, will result in a simplified component mesh that remains manifold. Upon verification that the selected edge collapse will produce a simplified component mesh that is manifold, edge collapsing module 108 can perform the selected edge collapse. Otherwise, geometry insertion module 105 can be employed to add geometry (e.g., vertices and accompanying triangles) to preserve mesh manifoldness, vertex age tracking module 106 can be employed to track inserted vertices, and cost calculation module 107 can be employed to calculate edge collapse costs associated with the added geometry.

By selecting and performing edge collapses based on their relative costs, edge collapsing module 108 can interleave the performing of boundary edge collapses and the performing of interior edge collapses. For instance, an interior edge collapse can be performed before performing a boundary edge collapse when the cost of performing the interior edge collapse is lower than the cost of performing the boundary edge collapse. As an example, performing candidate edge collapses can involve performing one or more interior edge collapses between the performing of one boundary edge collapse and another boundary collapse, in contrast to performing all boundary edges followed by performing all interior edge collapses or vice versa. Interleaving does not require a particular alternating pattern such as boundary-interior-boundary-interior or the like. Rather, interleaving can refer to various patterns of performing candidate edge collapses in a way that intermixes the performing of boundary edge collapses and the performing of interior edge collapses during simplification of a component mesh.

The interleaving of boundary edge collapses and interior edge collapses by edge collapsing module 108 reduces the number of artifacts that are introduced through the mesh simplification process, as compared to separately performing all boundary edge collapses first and then performing interior edge collapses. The interleaving of boundary edge collapses and interior edge collapses also can help to preserve mesh manifoldness and avoid situations in which it is necessary to insert additional geometry. The interleaving of edge collapses based on their relative costs also allows edges formed by inserted vertices to be collapsed before edges formed by original vertices so that more properties of the input mesh can be maintained when geometry is added in order to preserve mesh manifoldness.

When a particular interior edge is to be collapsed, edge collapsing module 108 can collapse the vertices $V_0$, $V_1$ of the particular interior edge into a resulting vertex at a point $V'$ that is or was calculated by using and/or minimizing the expression:

$$D(V',F_1)+D(V',F_2)+ \ldots +D(V',F_n)$$

In this expression, the terms $F_1, F_2, \ldots, F_n$ represent the set of all faces that have $V_0$ or $V_1$ as vertices, and $D(V,F)$ represents the distance from a point V to the plane containing the face F. It is to be appreciated that one or more of vertices $V_0$, $V_1$ can be an original vertex, an inserted vertex, or a vertex resulting from a prior edge collapse.

When a particular boundary edge is to be collapsed, edge collapsing module 108 can collapse the vertices $V_0$, $V_1$ of the particular boundary edge into a resulting vertex at a point $V'$ that is or was calculated by using and/or minimizing the expression:

$$D(V',P_1)+D(V',P_2)+ \ldots +D(V',P_n)+D(V',P_{boundary})$$

In this expression, the term $P_{boundary}$ is the boundary plane (i.e. a plane formed by a boundary constraint). Edges $E_1$, $E_2, \ldots E_n$ are boundary edges that have $V_0$ or $V_1$ as a vertex. The terms $P_1, P_2, \ldots P_n$ represent respective planes containing edges $E_1, E_2, \ldots E_n$, respectively, and also containing the vector $N_{boundary}$ that is perpendicular to the plane $P_{boundary}$. The term $D(V,P)$ represents the distance from a point V to a plane P. It is to be appreciated that one or more of vertices $V_0$, $V_1$ can be an original vertex, an inserted vertex, or a vertex resulting from a prior edge collapse.

As mentioned, the use of this non-standard boundary edge collapse function allows edge collapsing module 108 to collapse a boundary edge at a position that is calculated independently of the interior of the component mesh. For instance, the resulting vertex of a boundary edge can be determined using only boundary information. In addition, this non-standard boundary edge collapse functional almost guarantees that the position of the resulting vertex will lie on the boundary plane that separates one simplified component mesh from another simplified component mesh. As a result, edge collapsing module 108 can produce a simplified component mesh having fewer artifacts and having a boundary that simplifies identically to a boundary of an adjacent simplified component mesh, which facilitates the process of combining adjacent simplified component meshes.

Edge collapsing module 108 simplifies each component mesh to produce a simplified component mesh that can be combined with one or more adjacent simplified component meshes. Edge collapsing module 108 can store mesh data representing the simplified component mesh in memory storage 110 for retrieval by combining module 109 and/or provide the mesh data to combining module 109.

In order to produce a simplified mesh that is consistent across component mesh boundaries and without unnecessary artifacts, adjacent component meshes must have boundaries that simplify identically where the two adjacent, component meshes meet. Edge collapsing module 108 can produce a simplified component mesh having vertices along a boundary that align with the vertices in another simplified component mesh so that properties of the input mesh are maintained when the simplified component meshes are combined. Producing simplified component meshes with shared vertices along a common boundary (e.g., boundary plane) eliminates the need to use post-processing algorithms to produce a combined simplified mesh. Producing simplified component meshes having consistent boundaries also eliminates artifacts that would otherwise be introduced if other simplification techniques were used.

Edges from adjacent meshes are processed in the same order. For instance, on the shared boundary, one mesh is processed clockwise and in the other adjacent mesh that same boundary is processed counterclockwise. Processing adjacent meshes in this way provides stability that is not afforded by the QSLIM algorithm.

Combining module 109 can be configured and utilized to combine a simplified component mesh with another simplified component mesh along a common boundary, such as a boundary plane or other boundary constraint. As described above, the non-standard approach of performing boundary edge collapses and the interleaving of boundary edge collapses and interior edge collapses can produce adjacent simplified component meshes having shared vertices that lie within a common boundary plane, which facilitates conjoining the adjacent simplified component meshes. Once combining module 109 produces combined simplified component meshes, edge collapsing module 108 can be utilized to perform additional edge collapsing operations on the combined simplified component meshes. After simplification is complete, computer system 100 can display a visual representation of a simplified output mesh on a display device.

Exemplary Parallel Mesh Simplification

FIGS. 2A-2H illustrate exemplary output that can be displayed on a user interface to represent computer-generated meshes produced when performing parallel mesh simplification operations. The computer-generated meshes constitute visual representations of three-dimensional surfaces. It is to be appreciated that the output can be produced by computer system 100 or other suitable computer systems. For instance, computer system 100 can display visual representations of output from mesh generation module 101, mesh decomposition module 102, edge collapsing module 108, and/or combining module 109 at various stages of the mesh simplification process.

Figure 2A:
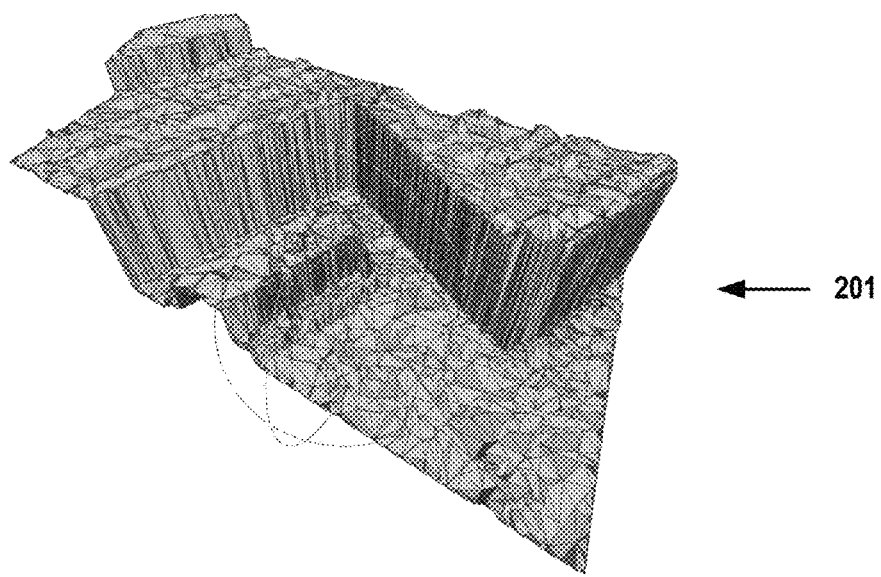
FIG. 2A illustrates an input mesh representing a three-dimensional model surface.

Referring to FIG. 2A, with continuing reference to the foregoing figure, an input mesh 201 can be displayed by computer system 100 to present a visual representation of a three-dimensional model surface. As shown, input mesh 201 is composed of a plurality of polygons (i.e., faces or triangles) interconnected by vertices and edges. Computer system 100 can generate input mesh 201 utilizing mesh generation module 101.

Figure 2B:
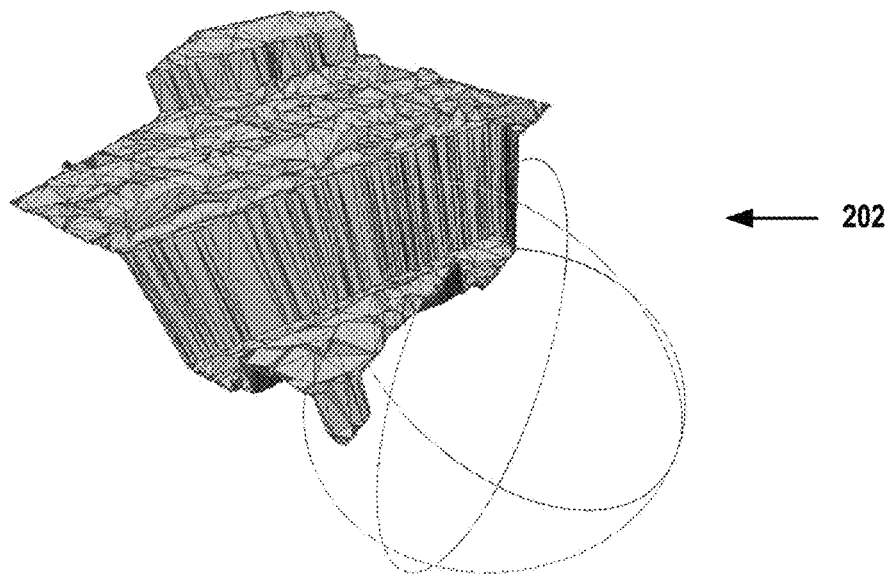
FIGS. 2B and 2C illustrate component meshes produced by decomposing an input mesh.
Figure 2C:
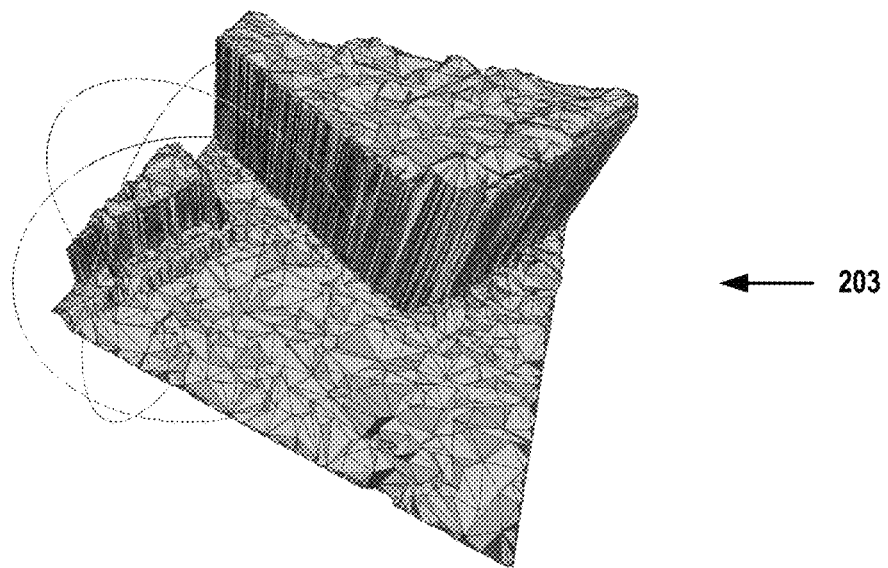

Referring to FIGS. 2B and 2C, with continuing reference to the foregoing figures, a component mesh 202 and/or a component mesh 203 can be displayed by computer system 100. As shown, each of component mesh 202 and component mesh 203 is composed of a plurality of polygons (i.e., faces or triangles) interconnected by vertices and edges. Component mesh 202 and component mesh 203 are adjacent component meshes that are geometrically separate and share a common boundary. Computer system 100 can utilize mesh decomposition module 102 to decompose mesh 201 into component mesh 202 and component mesh 203.

Figure 2D:
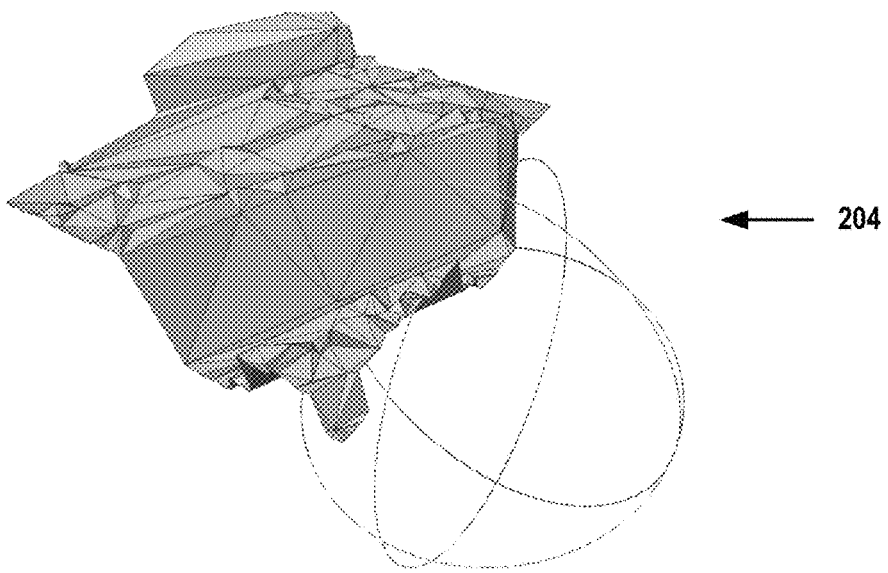
FIGS. 2D and 2E illustrate simplified component meshes.
Figure 2E:
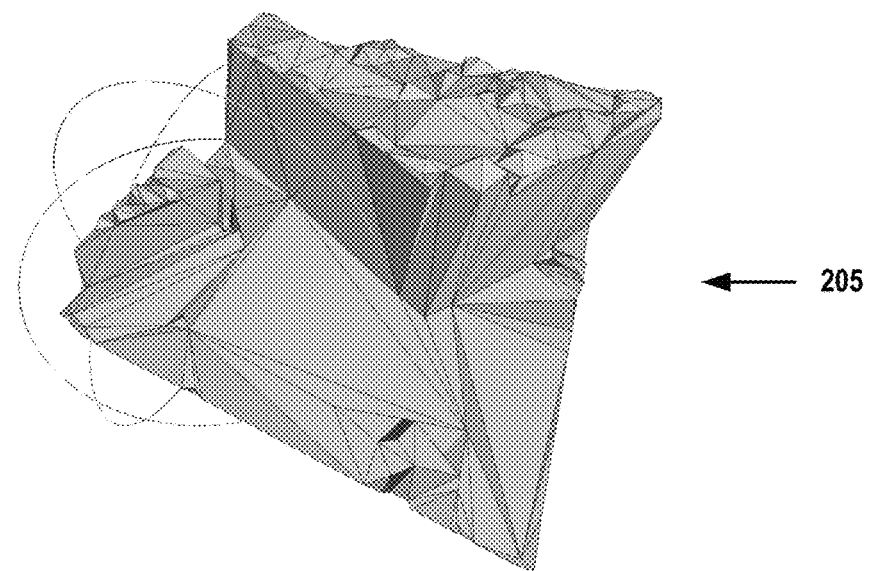

Referring to FIGS. 2D and 2E, with continuing reference to the foregoing figures, a simplified component mesh 204 and/or a simplified component mesh 205 can be displayed by computer system 100. As shown, simplified component mesh 204 has a reduced number of polygons (i.e., faces or triangles) interconnected by vertices and edges with respect to component mesh 202 and simplified component mesh 205 has a reduced number of polygons (i.e., faces or triangles) interconnected by vertices and edges with respect to component mesh 203. Computer system 100 can produce simplified component mesh 204 by simplifying component mesh 202 and can produce simplified component mesh 205 by simplifying component mesh 203.

The simplification of component mesh 202 and component mesh 203 can be performed in parallel by computer system 100, which can produce simplified component mesh 204 and simplified component mesh 205 utilizing edge identification module 103, manifold verification module 104, geometry insertion module 105, vertex age tracking module 106, cost calculation module 107, and edge collapsing module 108. Producing simplified component mesh 204 can involve the interleaving of boundary edge collapses and interior edge collapses based on the relative costs of the candidate edge collapses of component mesh 202. Likewise, producing simplified component mesh 205 can involve the interleaving of boundary edge collapses and interior edge collapses based on the relative costs of the candidate edge collapses of component mesh 203. Boundary edges that are common to component mesh 202 and component mesh 203 can be simplified identically and independently of the interior edges of component mesh 202 and component mesh 203. As a result, simplified component mesh 204 and simplified component mesh 205 can maintain a consistent boundary with shared vertices that lie along the boundary.

Figure 2F:
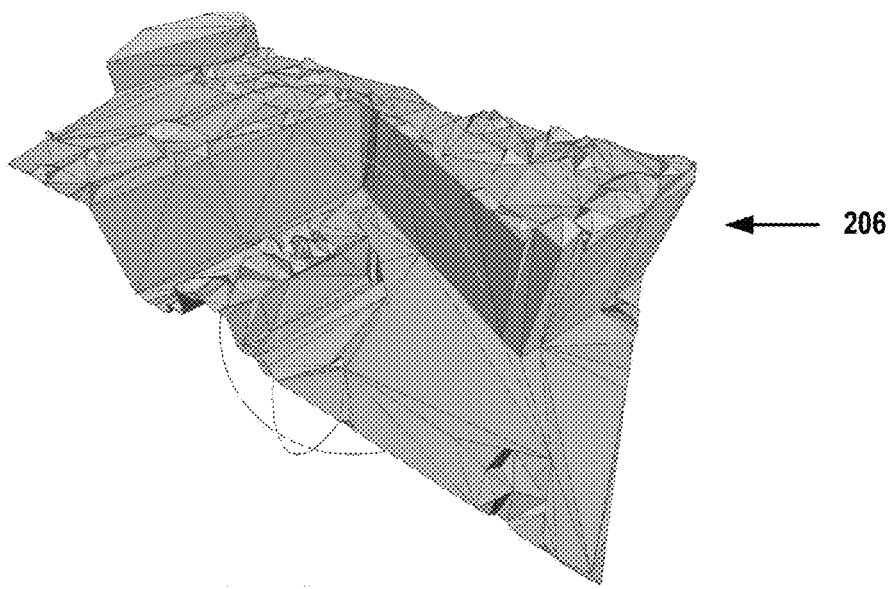
FIGS. 2F and 2G illustrate combined simplified component meshes.
Figure 2G:
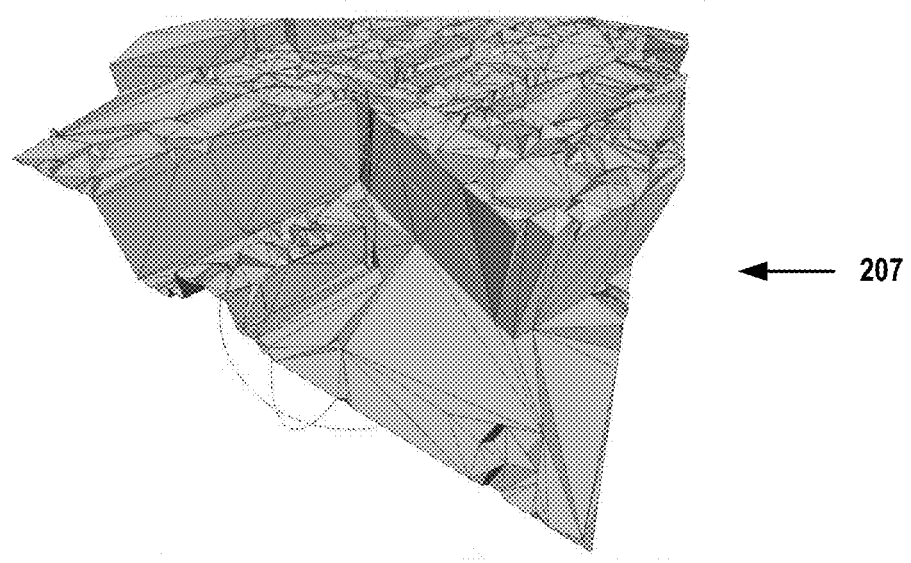

Referring to FIGS. 2F and 2G, with continuing reference to the foregoing figures, combined simplified component meshes 206 and/or combined simplified meshes 207 can be displayed by computer system 100. As shown, combined simplified component meshes 206 include simplified component mesh 204 and simplified component mesh 205, rejoined along a common simplified boundary. Combined simplified component meshes 207 can be produced by further combining one or more additional simplified component meshes with combined simplified component meshes 206. Computer system 100 can produce combined simplified component meshes 206 and/or combined simplified component meshes 207 utilizing combining module 109.

Figure 2H:
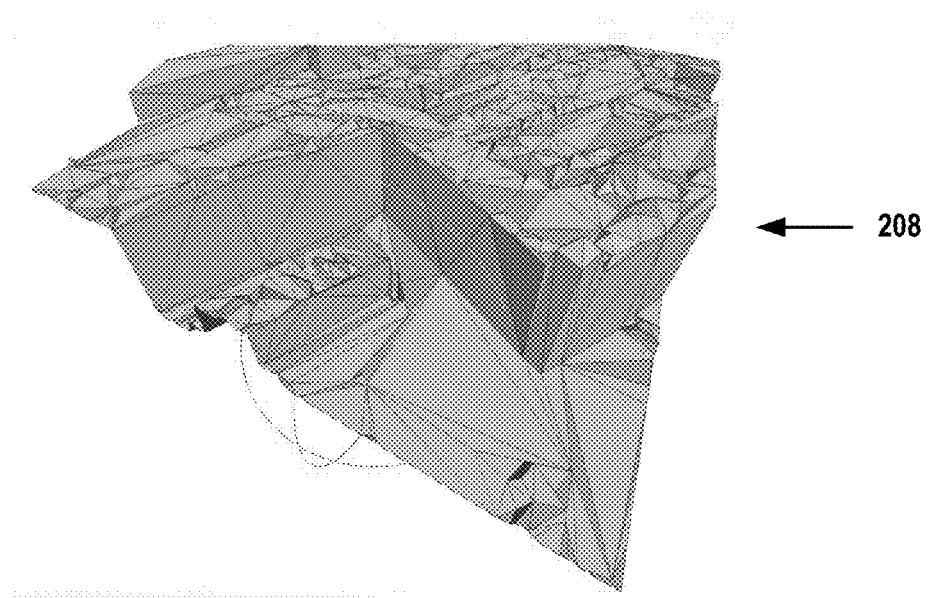
FIG. 2H illustrates a simplified output mesh.

Referring to FIG. 2H, with continuing reference to the foregoing figures, a simplified output mesh 208 can be displayed by computer system 100. As shown, simplified output mesh 208 has a reduced number of polygons (i.e., faces or triangles) interconnected by vertices and edges with respect to combined simplified component meshes 207.

Computer system 100 can produce simplified output mesh 208 by utilizing edge collapsing module 108 to perform additional edge collapses on combined simplified component meshes 207.

Exemplary Preservation of Mesh Manifoldness

FIGS. 3A-3C illustrates an example of preserving mesh manifoldness in accordance with aspect of the described subject matter. It is to be appreciated that operations to preserve mesh manifoldness can be performed by computer system 100 or other suitable computer systems. For instance, computer system 100 can perform operations to preserve mesh manifoldness utilizing edge identification module 103, manifold verification module 104, geometry insertion module 105, vertex age tracking module 106, cost calculation module 107, and/or edge collapsing module 108 at various stages of the mesh simplification process.

Referring to FIG. 3A, with continuing reference to the foregoing figures, a manifold component mesh 300 that would become non-manifold, if simplified, is shown. Manifold component mesh 300 in its current state is an orientable 2-manifold with boundary. If manifold component mesh 300 was simplified by collapsing boundary edge 301, then interior edge 302 and interior edge 303 would no longer be distinct. As a result, manifold component mesh 300 would become non-manifold. Before the collapse of boundary edge 301 is performed, computer system 100 can utilize manifold verification module 104 to preemptively determine that manifold component mesh 300 would become non-manifold.

Referring to FIG. 3B, with continuing reference to the foregoing figures, additional geometry is inserted into manifold component mesh 300 to preserve mesh manifoldness. As shown, original vertex 304 and original vertex 305 of boundary edge 301 are cloned to produce cloned vertex 306 and cloned vertex 307, respectively. Cloned vertex 306 and cloned vertex 307, along with four new faces (e.g., triangles), are inserted into manifold component mesh 301. Computer system 100 can utilize geometry insertion module 105 to add geometry to manifold component mesh 300 such that the new faces are contained completely within the boundary plane. To illustrate the addition of new geometry, cloned vertex 306 and cloned vertex 307 are shown as being moved. In operation, however, cloned vertex 306 can be co-located with original vertex 304, and cloned vertex 307 can be co-located with original vertex 305.

After the insertion of the additional geometry, the age of each of cloned vertex 306 and cloned vertex 307 can be tracked. In one implementation, a weighting factor of 0.0 can be assigned to cloned vertex 306 and cloned vertex 307, while original vertices including original vertex 304 and original vertex 305 are assigned a weighting factor of 1.0. Computer system 100 can utilize vertex age tracking module 106 to track the ages of cloned vertex 306 and cloned vertex 307 and assign weighting factors.

When additional geometry is inserted, costs associated with collapsing the new edges (e.g., new boundary edge 308, new interior edge 309 which is no longer a boundary edge, etc.) can be calculated. The costs associated with collapsing the original edges of manifold component mesh 300 that were unaffected by the added geometry also can be calculated or such costs may have been calculated previously. Computer system 100 can use cost calculation module 107 to calculate the costs associated with candidate edge collapses. When calculating the cost of collapsing new boundary edge 308, cost calculation module 107 can take into account the age of cloned vertex 306 and cloned vertex 307. Due to the weighting factor of 0.0 assigned to cloned vertex 306 and cloned vertex 307, collapsing new boundary edge 308 can have the lowest cost and can be selected as the next edge collapse to perform.

Referring to FIG. 3C, with continuing reference to the foregoing figures, simplification of manifold component mesh 300 is performed after the insertion of the additional geometry. As shown, new vertex 310 results from collapsing new boundary edge 308. After collapsing new boundary edge 308 to form new vertex 310, manifold component mesh 300 is an orientable 2-manifold with boundary. While geometry insertion can be followed by an edge collapse, geometry also can be inserted to avoid the need to perform an edge collapse. For instance, new vertex 310 and the three new faces (e.g., triangles) can be inserted into the manifold component mesh 300 shown in FIG. 3A to avoid the need to collapse the new boundary edge 308 shown in FIG. 3B.

Exemplary Process

Figure 4:
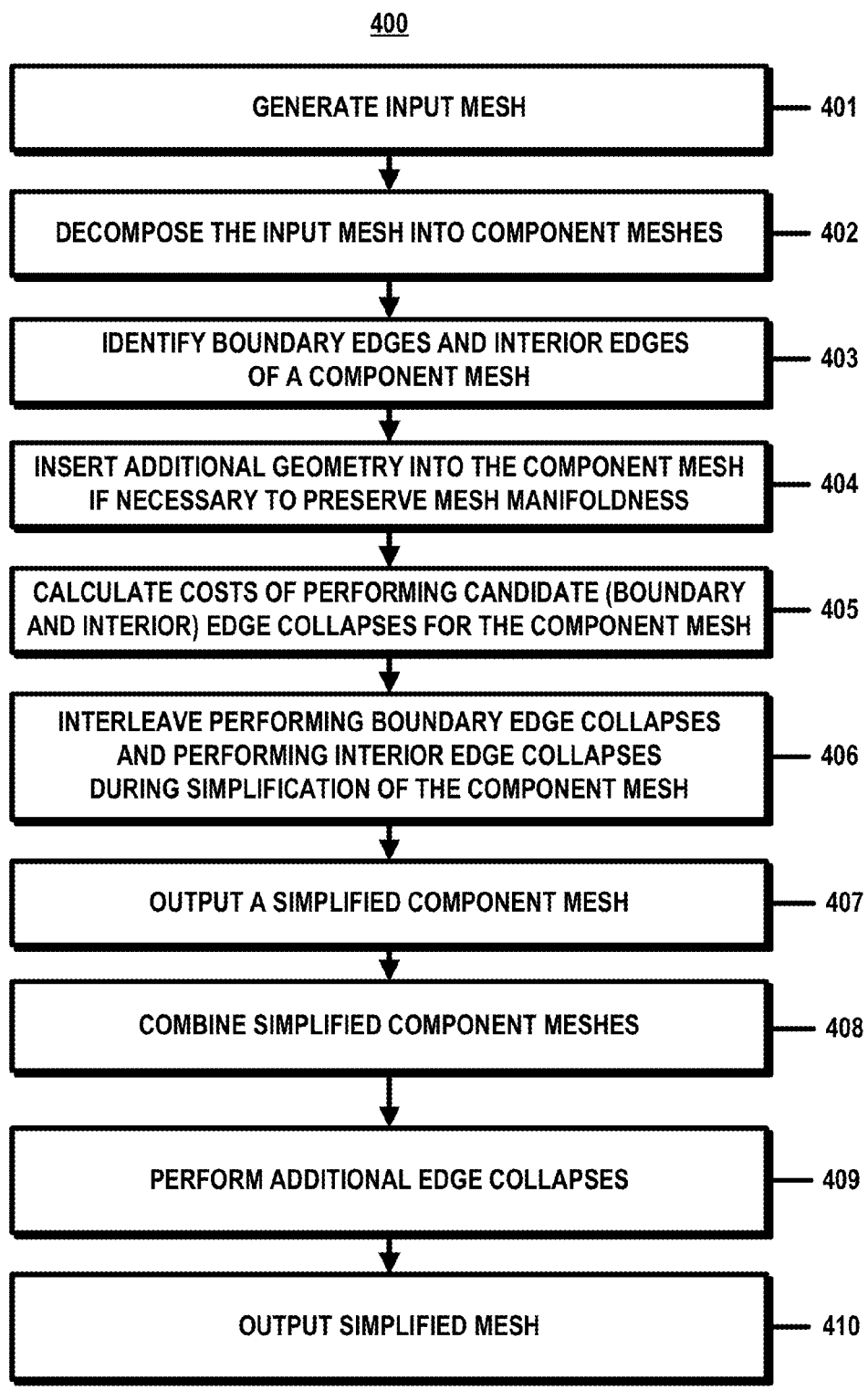
FIG. 4 illustrates an embodiment of an exemplary process in accordance with aspects of the described subject matter.

FIG. 4 illustrates a computer-implemented method 400 as an embodiment of an exemplary process in accordance with aspects of the described subject matter. It can be appreciated that computer-implemented method 400, or portions thereof, can be performed by one or more computing devices, a computer system, computer-executable instructions, software, hardware, firmware or a combination thereof in various embodiments. For example and with continuing reference to the foregoing figures, computer-implemented method 400 can be performed by computer system 100 or other suitable computer system.

At 401, a computer system can generate an input a mesh. For example, computer system 100 can utilize mesh generation module 101 to generate input mesh 201. The input mesh can represent various types of three-dimensional model surfaces.

At 402, the computer system can decompose the input mesh into component meshes. For example, computer system 100 can utilize mesh decomposition module 102 to decompose input mesh 201 into a plurality of component meshes such as component mesh 202 and component mesh 203. Each component mesh can represent a portion of a three-dimensional model surface.

At 403, the computer system can identify boundary edges and interior edges of a component mesh. For example, computer system 100 can utilize edge identification module 103 to identify boundary edges and interior edges of component mesh 202 and/or component mesh 203. Identified boundary edges and interior edges can be used to determine candidate edge collapses, costs of performing candidate edge collapses, and/or to perform other mesh simplification operations.

At 404, the computer system can insert additional geometry into the component mesh if necessary to preserve manifoldness. For example, computer system 100 can utilize manifold verification module 104 to verify in advance of performing a particular edge collapse that manifold component mesh 300 would remain manifold if the particular edge collapse was performed. Computer system 100 can preemptively determine that a subsequent edge collapse would cause manifold component mesh 300 to become non-manifold. Computer system 100 can utilize geometry insertion module 105 to insert additional geometry (e.g., cloned vertex 306, cloned vertex 307, and accompanying new faces or triangles) into manifold component mesh 300 to preserve manifoldness if the particular edge collapse would cause the component mesh to become non-manifold. When geometry is inserted into manifold component mesh 300, computer system 100 can utilize vertex age tracking module 106 to track the age of each vertex in the additional geometry.

Computer system 100 can utilize vertex age tracking module 106 to assign a weighting factor to each inserted vertex (e.g., cloned vertex 306, cloned vertex 307) based on its age.

At 405, the computer system can calculate costs of performing candidate edge collapses (e.g., boundary edge collapses and interior edge collapses) for the component mesh. For example, computer system 100 can utilize cost calculation module 107 to calculate costs of performing boundary edge collapses and performing interior edge collapses. A cost of performing a boundary edge collapse can be calculated based on a position of a resulting vertex of the boundary edge collapse. For instance, the cost of performing the boundary edge collapse can be calculated based on distances from the position of the resulting vertex to respective planes and to a boundary plane. The respective planes can contain a respective edge formed by one of the vertices of the boundary edge and further can contain a vector that is perpendicular to the boundary plane. When geometry is inserted into the component mesh to preserve manifoldness, a cost of performing a particular candidate edge collapse can be calculated based on an age of one or more vertices in the additional geometry. For instance, a cost of collapsing a new edge formed by an inserted vertex can be calculated using a weighting factor so that the new edge is collapsed before edges formed by original vertices are collapsed.

At 406, the computer system can interleave performing boundary edge collapses and performing interior edge collapses during simplification of the component mesh. For example, computer system 100 can utilize edge collapsing module 108 to interleave the performing of boundary edge collapses and the performing of interior edge collapses based on the costs of performing the candidate edge collapses to simplify the component mesh. Execution of boundary edge collapses and execution of interior edge collapses can be interleaved in an order (e.g., lowest cost to highest cost) based the calculated costs of performing the candidate edge collapses. For instance, computer system 100 can select the candidate edge collapse (e.g., boundary edge collapse or interior edge collapse) having the lowest cost as the next edge collapse to perform. Performing one or more interior edge collapses can be interleaved between performing of one boundary edge collapse and another boundary edge collapse.

Computer system 100 can collapse vertices of a boundary edge into a resulting vertex at a position that is calculated independently of interior edges and/or positions of vertices that form interior edges of the component mesh. Computer system 100 can collapse vertices of a boundary edge into a resulting vertex at a position that is calculated based on distances to respective planes and to a boundary plane. Each respective plane can contain a respective edge formed by one of the vertices of the boundary edge and further can contain a vector that is perpendicular to the boundary plane. Computer system 100 can collapse a boundary edge along a shared boundary between a component mesh and an adjacent component mesh into a resulting vertex at a position that is calculated based only on positions of vertices that form boundary edges in the shared boundary.

At 407, the computer system can output a simplified component mesh. For example, computer system 100 can produce and output simplified component mesh 204 and/or simplified component mesh 205. Simplification of component mesh 202 can produce simplified component mesh 204 having a boundary that is identical to a boundary of simplified component mesh 205.

At 408, the computer system can combine simplified component meshes. For example, computer system 100 can utilize combining module 109 to combine simplified component mesh 204 and simplified component mesh 205 to form combined simplified component meshes 206. Simplified component mesh 204 and simplified component mesh 205 can be combined along an identical simplified boundary.

At 409, the computer system can perform additional edge collapses. For example, computer system 100 can utilize edge collapsing module 108 to perform additional edge collapses to further simplify combined simplified component meshes 207.

At 410, the computer system can output a simplified mesh. For example, computer system 100 can produce simplified output mesh 208 after performing further simplification of combined simplified component meshes 207.

Exemplary Computing Device and/or Computer System

Aspects of the described subject matter can be implemented for and/or by various operating environments, computer networks, platforms, frameworks, computer architectures, and/or computing devices to provide mesh simplification. Aspects of the described subject matter can be implemented by computer-executable instructions that can be executed by one or more computing devices, computer systems, and/or processors.

In its most basic configuration, a computing device and/or computer system can include at least one processing unit (e.g., single-processor units, multi-processor units, single-core units, and/or multi-core units) and memory. Depending on the exact configuration and type of computer system or computing device, the memory implemented by a computing device and/or computer system can be volatile (e.g., random access memory (RAM)), non-volatile (e.g., read-only memory (ROM), flash memory, and the like), or a combination thereof.

A computing devices and/or computer system can have additional features and/or functionality. For example, a computing device and/or computer system can include hardware such as additional storage (e.g., removable and/or non-removable) including, but not limited to: solid state, magnetic, optical disk, or tape.

A computing device and/or computer system typically can include or can access a variety of computer-readable media. For instance, computer-readable media can embody computer-executable instructions for execution by a computing device and/or a computer system. Computer readable media can be any available media that can be accessed by a computing device and/or a computer system and includes both volatile and non-volatile media, and removable and non-removable media. As used herein, the term "computer-readable media" includes computer-readable storage media and communication media.

The term "computer-readable storage media" as used herein includes volatile and nonvolatile, removable and non-removable media for storage of information such as computer-executable instructions, data structures, program modules, or other data. Examples of computer-readable storage media include, but are not limited to: memory storage devices such as RAM, ROM, electrically erasable program read-only memory (EEPROM), semiconductor memories, dynamic memory (e.g., dynamic random access memory (DRAM), synchronous dynamic random access memory (SDRAM), double data rate synchronous dynamic random-access memory (DDR SDRAM), etc.), integrated circuits, solid-state drives, flash memory (e.g., NAN-based flash memory), memory chips, memory cards, memory sticks, thumb drives, and the like; optical storage media such as Blu-ray discs, digital video discs (DVDs), compact discs (CDs), CD-ROM, optical disc cartridges, and the like;

magnetic storage media including hard disk drives, floppy disks, flexible disks, magnetic cassettes, magnetic tape, and the like; and other types of computer-readable storage devices. It can be appreciated that various types of computer-readable storage media (e.g., memory and additional hardware storage) can be part of a computing device and/or a computer system. As used herein, the terms "computer-readable storage media" and "computer-readable storage medium" do not mean and unequivocally exclude a propagated signal, a modulated data signal, and/or a carrier wave.

Communication media embodies data in a propagated signal, modulated data signal such, and/or carrier wave as a transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media.

In various embodiments, aspects of the described subject matter can be implemented by computer-executable instructions stored on one or more computer-readable storage media. Computer-executable instructions can be implemented using any various types of suitable programming and/or markup languages such as: Extensible Application Markup Language (XAML), XML, XBL HTML, XHTML, XSLT, XMLHttpRequestObject, CSS, Document Object Model (DOM), Java®, JavaScript, JavaScript Object Notation (JSON), Jscript, ECMAScript, Ajax, Flash®, Silverlight™ Visual Basic® (VB), VBScript, PHP, ASP, Shockwave®, Python, Perl®, C, Objective-C, C+ . . . +, C#/.net, and/or others.

A computing device and/or computer system can include various input devices, output devices, communication interfaces, and/or other types of devices. Exemplary input devices include, without limitation: a user interface, a keyboard/keypad, a touch screen, a touch pad, a pen, a mouse, a trackball, a remote control, a game controller, a camera, a barcode reader, a microphone or other voice input device, a video input device, laser range finder, a motion sensing device, a gesture detection device, and/or other type of input mechanism and/or device. A computing device can provide a Natural User Interface (NUI) that enables a user to interact with the computing device in a "natural" manner, free from artificial constraints imposed by input devices such as mice, keyboards, remote controls, and the like. Examples of NUI technologies include, without limitation: voice and/or speech recognition, touch and/or stylus recognition, motion and/or gesture recognition both on screen and adjacent to a screen using accelerometers, gyroscopes and/or depth cameras (e.g., stereoscopic or time-of-flight camera systems, infrared camera systems, RGB camera systems and/or combination thereof), head and eye tracking, gaze tracking, facial recognition, 3D displays, immersive augmented reality and virtual reality systems, technologies for sensing brain activity using electric field sensing electrodes (EEG and related methods), intention and/or goal understanding, and machine intelligence.

A computing device can be configured to receive and respond to input in various ways depending upon implementation. Responses can be presented in various forms including, for example: presenting a user interface, outputting an object such as an image, a video, a multimedia object, a document, and/or other type of object; outputting a text response; providing a link associated with responsive content; outputting a computer-generated voice response or other audio; or other type of visual and/or audio presentation of a response. Exemplary output devices include, without limitation: a display, a projector, a speaker, a printer, and/or other type of output mechanism and/or device.

A computing device and/or computer system can include one or more communication interfaces that allow communication between and among other computing devices and/or computer systems. Communication interfaces can be used in the context of network communication between and among various computing devices and/or computer systems. Communication interfaces can allow a computing device and/or computer system to communicate with other devices, other computer systems, web services (e.g., an affiliated web service, a third-party web service, a remote web service, and the like), web service applications, and/or information sources (e.g. an affiliated information source, a third-party information source, a remote information source, and the like). As such communication interfaces can be used in the context of accessing, obtaining data from, and/or cooperating with various types of resources.

Communication interfaces also can be used in the context of distributing computer-executable instructions over a network. For example, computer-executable instructions can be combined or distributed utilizing remote computers and storage devices. A local or terminal computer can access a remote computer or remote storage device and download a computer program or one or more parts of the computer program for execution. It also can be appreciated that the execution of computer-executable instructions can be distributed by executing some instructions at a local terminal and executing some instructions at a remote computer.

A computing device can be implemented by a mobile computing device such as: a mobile phone (e.g., a cellular phone, a smart phone such as a Microsoft® Windows® phone, an Apple iPhone, a BlackBerry® phone, a phone implementing a Google® Android™ operating system, a phone implementing a Linux® operating system, or other type of phone implementing a mobile operating system), a tablet computer (e.g., a Microsoft® Surface® device, an Apple iPad™, a Samsung Galaxy Note® Pro, or other type of tablet device), a laptop computer, a notebook computer, a netbook computer, a personal digital assistant (PDA), a portable media player, a handheld gaming console, a wearable computing device (e.g., a smart watch, a head-mounted device including smart glasses such as Google® Glass™, a wearable monitor, etc.), a personal navigation device, a vehicle computer (e.g., an on-board navigation system), a camera, or other type of mobile device.

A computing device can be implemented by a stationary computing device such as: a desktop computer, a personal computer, a server computer, an entertainment system device, a media player, a media system or console, a video-game system or console, a multipurpose system or console (e.g., a combined multimedia and video-game system or console such as a Microsoft® Xbox® system or console, a Sony® PlayStation® system or console, a Nintendo® system or console, or other type of multipurpose game system or console), a set-top box, an appliance (e.g., a television, a refrigerator, a cooking appliance, etc.), or other type of stationary computing device.

A computing device also can be implemented by other types of processor-based computing devices including digital signal processors, field-programmable gate arrays (FPGAs), program- and application-specific integrated circuits (PASIC/ASICs), program- and application-specific standard products (PSSP/ASSPs), a system-on-a-chip (SoC), complex programmable logic devices (CPLDs), and the like.

A computing device can include and/or run one or more computer programs implemented, for example, by software, firmware, hardware, logic, and/or circuitry of the computing device. Computer programs can be distributed to and/or installed on a computing device in various ways. For instance, computer programs can be pre-installed on a computing device by an original equipment manufacturer (OEM), installed on a computing device as part of installation of another computer program, downloaded from an application store and installed on a computing device, distributed and/or installed by a system administrator using an enterprise network management tool, and distributed and/or installed in various other ways depending upon the implementation.

Computer programs implemented by a computing device can include one or more operating systems. Exemplary operating systems include, without limitation: a Microsoft® operating system (e.g., a Microsoft® Windows® operating system), a Google® operating system (e.g., a Google® Chrome OS™ operating system or a Google® Android™ operating system), an Apple operating system (e.g., a Mac OS® or an Apple iOS™ operating system), an open source operating system, or any other operating system suitable for running on a mobile, stationary, and/or processor-based computing device.

Computer programs implemented by a computing device can include one or more client applications. Exemplary client applications include, without limitation: a web browsing application, a communication application (e.g., a telephony application, an e-mail application, a text messaging application, an instant messaging application, a web conferencing application, and the like), a media application (e.g., a video application, a movie service application, a television service application, a music service application, an e-book application, a photo application, and the like), a calendar application, a file sharing application, a personal assistant or other type of conversational application, a game application, a graphics application, a shopping application, a payment application, a social media application, a social networking application, a news application, a sports application, a weather application, a mapping application, a navigation application, a travel application, a restaurants application, an entertainment application, a healthcare application, a lifestyle application, a reference application, a finance application, a business application, an education application, a productivity application (e.g., word processing application, a spreadsheet application, a slide show presentation application, a note-taking application, and the like), a security application, a tools application, a utility application, and/or any other type of application, application program, and/or app suitable for running on a mobile, stationary, and/or processor-based computing device.

Computer programs implemented by a computing device can include one or more server applications. Exemplary server applications include, without limitation: one or more server-hosted, cloud-based, and/or online applications associated with any of the various types of exemplary client applications described above; one or more server-hosted, cloud-based, and/or online versions of any of the various types of exemplary client applications described above; one or more applications configured to provide a web service, a web site, a web page, web content, and the like; one or more applications configured to provide and/or access an information source, data store, database, repository, and the like; and/or other type of application, application program, and/or app suitable for running on a server computer.

A computer system can be implemented by a computing device, such as a server computer, or by multiple computing devices configured to implement a service in which one or more suitably-configured computing devices can perform one or more processing steps. A computer system can be implemented as a distributed computing system in which components are located on different computing devices that are connected to each other through network (e.g., wired and/or wireless) and/or other forms of direct and/or indirect connections. A computer system also can be implemented via a cloud-based architecture (e.g., public, private, or a combination thereof) in which services are delivered through shared datacenters. Some components of a computer system can be disposed within a cloud while other components are disposed outside of the cloud.

Figure 5:
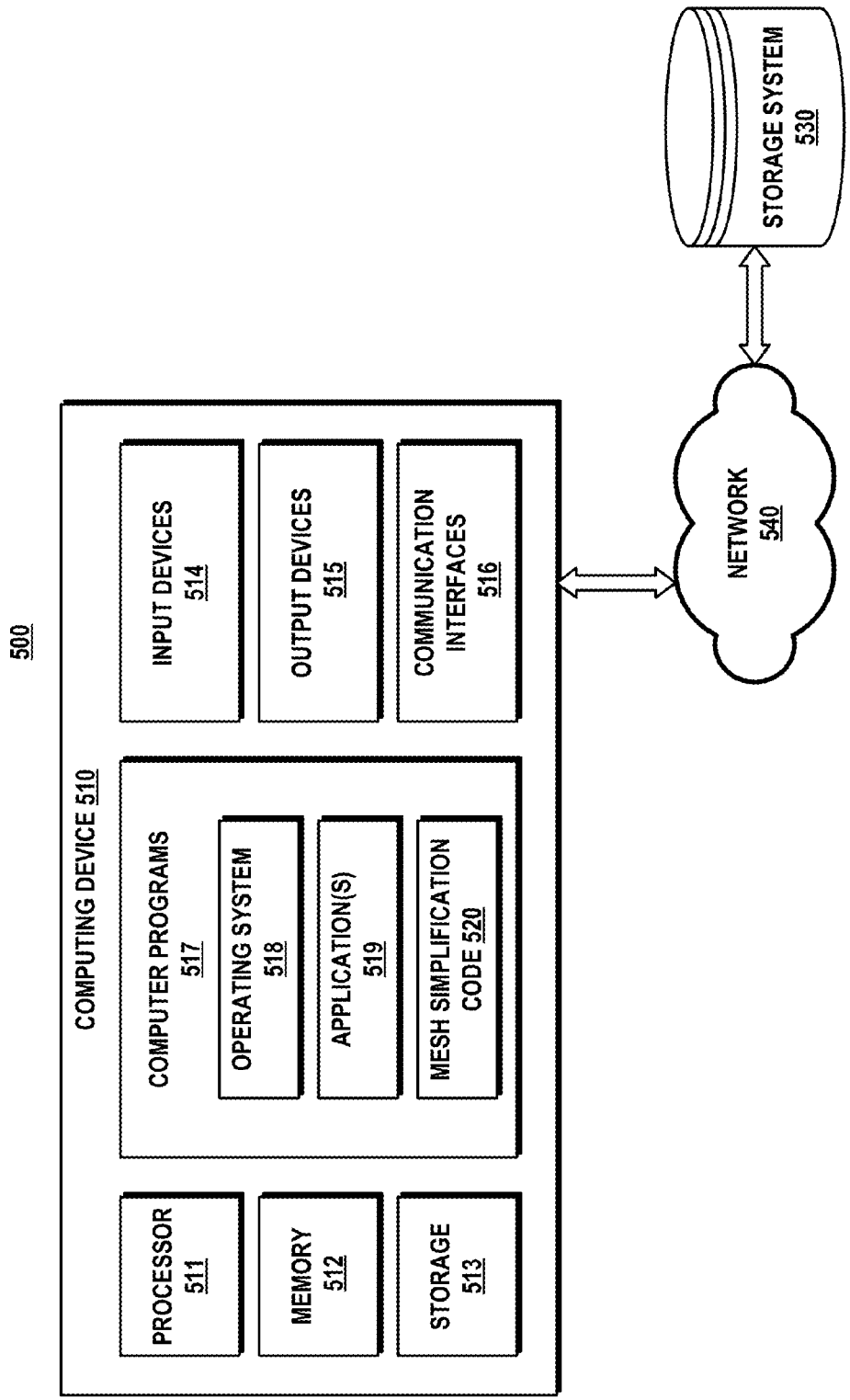
FIG. 5 illustrates an embodiment of an exemplary computer system including a computing device that can implement aspects of the described subject matter.

FIG. 5 illustrates a computer system 500 including a computing device 501 that can implement aspects of the described subject matter. As shown, computing device 510 includes a processor and memory 512. Computing device 510 also can include additional hardware storage 513. It is to be understood that computer-readable storage media includes memory 512 and hardware storage 513.

Computing device 510 can include input devices 514 and output devices 515. Input devices 514 can include one or more of the exemplary input devices described above and/or other type of input mechanism and/or device. Output devices 515 can include one or more of the exemplary output devices described above and/or other type of output mechanism and/or device.

Computing device 510 can contain one or more communication interfaces 516 that allow computing device 510 to communicate with other computing devices and/or computer systems over network 540. In various implementations, computing device 510 can employ communication interfaces 516 in the context of communicating over network 540 with storage system 530. Communication interfaces 516 also can be used in the context of distributing computer-executable instructions over network 540.

Computing device 510 can include and/or run one or more computer programs 517 implemented, for example, by software, firmware, hardware, logic, and/or circuitry of computing device 510. Computer programs 517 can include an operating system 518 implemented, for example, by one or more exemplary operating systems described above and/or other type of operating system suitable for running on computing device 510. Computer programs 517 can include one or more applications 519 implemented, for example, by one or more exemplary applications described above and/or other type of application suitable for running on computing device 510.

Computer programs 517 can be configured via one or more suitable interfaces (e.g., API or other data connection) to communicate and/or cooperate with one or more resources. Examples of resources include local computing resources of computing device 510 and/or remote computing resources such as server-hosted resources, cloud-based resources, online resources, remote data stores, remote databases, remote repositories, web services, web sites, web pages, web content, and/or other types of remote resources.

Computer programs 517 can implement computer-executable instructions that are stored in computer-readable storage media such as memory 512 or hardware storage 513, for example. Computer-executable instructions implemented by computer programs 517 can be configured to work in conjunction with, support, and/or enhance one or more of operating system 518 and applications 519. Computer-executable instructions implemented by computer programs 517 also can be configured to provide one or more separate and/or stand-alone services.

Computing device 510 and/or computer programs 517 can implement and/or perform various aspects of the described subject matter. As shown, computing device 510 and/or computer programs 517 can include mesh simplification code 520. In various embodiments, mesh simplification code 520 can include computer-executable instructions that are stored on a computer-readable storage medium and configured to implement one or more aspects of the described subject matter. By way of example, and without limitation, mesh simplification code 520 can implement one or more aspects of computer system 100 (e.g., mesh generation module 101, mesh decomposition module 102, edge identification module 103, manifold verification module 104, geometry insertion module 105, vertex age tracking module 106, cost calculation module 107, edge collapsing module 108, combining module 109) and/or computer-implemented method 400.

Computing device 510 can communicate with storage system 530 over a network 540 implemented by any type of network or combination of networks suitable for providing communication between computing device 510 and storage system 530. Network 540 can include, for example and without limitation: a WAN such as the Internet, a LAN, a telephone network, a private network, a public network, a packet network, a circuit-switched network, a wired network, and/or a wireless network. Computing device 510 and storage system 530 can communicate over network 540 using various communication protocols and/or data types. Alternatively or additionally, storage system 530 can be integrated with computing device 510.

Storage system 530 can be representative of various types of storage in accordance with the described subject matter. For example, storage system 530 can be configured to store mesh data, model data, geometric data and/or other types of data. Storage system can provide any suitable type of data storage for relational (e.g., SQL) and/or non-relational (e.g., NO-SQL) data using database storage, cloud storage, table storage, blob storage, file storage, queue storage, and/or other suitable type of storage mechanism. Storage system 530 can be implemented by one or more computing devices, such as a computer cluster in a datacenter, by virtual machines, and/or provided as a cloud-based storage service.

Figure 6:
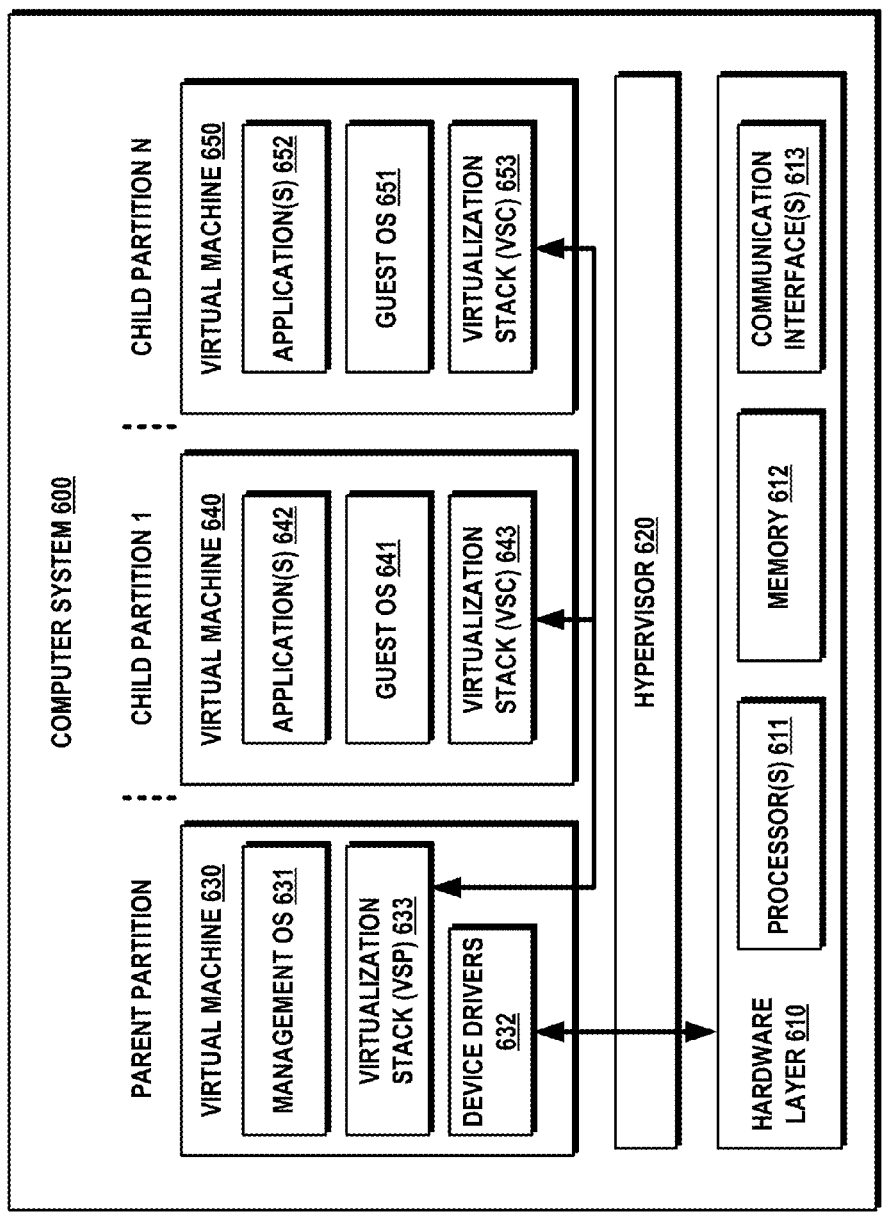
FIG. 6 illustrates an embodiment of an exemplary computer system that can implement aspects of the described subject matter.

FIG. 6 illustrates a computer system 600 as an embodiment of an exemplary computer system that can implement aspects of the described subject matter. In various implementations, deployment of computer system 600 and/or multiple deployments thereof can provide server virtualization for concurrently running multiple virtual servers instances on one physical host server computer and/or network virtualization for concurrently running multiple virtual network infrastructures on the same physical network.

Computer system 600 can be implemented by various computing devices such as one or more physical server computers that provide a hardware layer 610 which can include processor(s) 611, memory 612, and communication interface(s) 613. Computer system 600 can implement a hypervisor 620 configured to manage, control, and/or arbitrate access to hardware layer 610. In various implementations, hypervisor 620 can manage hardware resources to provide isolated execution environments or partitions such a parent (root) partition and one or more child partitions. A parent partition can operate to create one or more child partitions. Each partition can be implemented as an abstract container or logical unit for isolating processor and memory resources managed by hypervisor 620 and can be allocated a set of hardware resources and virtual resources. A logical system can map to a partition, and logical devices can map to virtual devices within the partition.

Parent and child partitions can implement virtual machines such as virtual machines 630, 640, and 650, for example. Each virtual machine can emulate a physical computing device or computer system as a software implementation that executes programs like a physical machine. Each virtual machine can have one or more virtual processors and can provide a virtual system platform for executing an operating system (e.g., a Microsoft® operating system, a Google® operating system, an operating system from Apple®, a Linux® operating system, an open source operating system, etc.). As shown, virtual machine 630 in parent partition can run a management operating system 631, and virtual machines 640, 650 in child partitions can host guest operating systems 641, 651 each implemented, for example, as a full-featured operating system or a special-purpose kernel. Each of guest operating systems 641, 651 can schedule threads to execute on one or more virtual processors and effectuate instances of application(s) 642, 652, respectively.

Virtual machine 630 in parent partition can have access to hardware layer 610 via device drivers 632 and/or other suitable interfaces. Virtual machines 640, 650 in child partitions, however, generally do not have access to hardware layer 610. Rather, such virtual machines 640, 650 are presented with a virtual view of hardware resources and are supported by virtualization services provided by virtual machine 630 in parent partition. Virtual machine 630 in parent partition can host a virtualization stack 633 that provides virtualization management functionality including access to hardware layer 610 via device drivers 632. Virtualization stack 633 can implement and/or operate as a virtualization services provider (VSP) to handle requests from and provide various virtualization services to a virtualization service client (VSC) implemented by one or more virtualization stacks 643, 653 in virtual machines 640, 650 that are operating in child partitions. Computer system 600 can implement and/or perform various aspects of the described subject matter. By way of example, and without limitation, one or more aspects of computer system 100 (e.g., mesh generation module 101, mesh decomposition module 102, edge identification module 103, manifold verification module 104, geometry insertion module 105, vertex age tracking module 106, cost calculation module 107, edge collapsing module 108, combining module 109) and/or computer-implemented method 400 can be implemented by virtual machines 640, 650 of computer system 600.

Supported Aspects

The detailed description provided above in connection with the appended drawings explicitly describes and supports various aspects of mesh simplification in accordance with the described subject matter. By way of illustration and not limitation, supported aspects include a computing device for performing mesh simplification, the computing device comprising: a processor configured to execute computer-executable instructions; and memory storing computer-executable instructions that, when executed by the processor, cause the computing device to: decompose an input mesh representing a three-dimensional model surface into a plurality of component meshes; calculate costs of performing candidate edge collapses for a component mesh, the candidate edge collapses including a plurality of boundary edge collapses and a plurality of interior edge collapses; and interleave the performing of one or more boundary edge collapses and the performing of one or more interior edge collapses in an order based on the costs of performing the candidate edge collapses during simplification of the component mesh.

Supported aspects include the forgoing computing device, wherein performing a boundary edge collapse comprises collapsing vertices of a boundary edge into a resulting vertex at a position that is calculated independently of positions of vertices that form interior edges of the component mesh.

Supported aspects include any of the forgoing computing devices, wherein performing a boundary edge collapse comprises collapsing a boundary edge along a shared boundary between a component mesh and an adjacent component mesh into a resulting vertex at a position that is calculated based only on positions of vertices that form boundary edges in the shared boundary.

Supported aspects include any of the forgoing computing devices, wherein simplification of the component mesh produces a simplified component mesh having a boundary that is identical to a boundary of an adjacent simplified component mesh.

Supported aspects include any of the forgoing computing devices, wherein performing a boundary edge collapse comprises collapsing vertices of a boundary edge into a resulting vertex at a position that is calculated based on distances to respective planes and to a boundary plane, each respective plane containing a respective edge formed by one of the vertices of the boundary edge and further containing a vector that is perpendicular to the boundary plane.

Supported aspects include any of the forgoing computing devices, wherein a cost of performing the boundary edge collapse is calculated based on distances from the position of the resulting vertex to the respective planes and to the boundary plane.

Supported aspects include any of the forgoing computing devices, wherein the memory further stores computer-executable instructions that, when executed by the processor, cause the computing device to: verify in advance of performing a particular edge collapse that the component mesh would remain manifold if the particular edge collapse was performed.

Supported aspects include any of the forgoing computing devices, wherein the memory further stores computer-executable instructions that, when executed by the processor, cause the computing device to: insert additional geometry into the component mesh to preserve manifoldness if the particular edge collapse would cause the component mesh to become non-manifold.

Supported aspects include any of the forgoing computing devices, wherein the memory further stores computer-executable instructions that, when executed by the processor, cause the computing device to: track an age of each vertex in the additional geometry.

Supported aspects include any of the forgoing computing devices, wherein a cost of performing a particular candidate edge collapse is calculated based on an age of at least one vertex in the additional geometry.

Supported aspects further include an apparatus, a system, a computer-readable storage medium, a computer-implemented method, and/or means for implementing any of the foregoing computing devices or portions thereof.

Supported aspects include a computer-implemented method for mesh simplification, the computer-implemented method comprising: decomposing an input mesh representing a three-dimensional model surface into a plurality of component meshes; calculating costs of performing boundary collapses and interior edge collapses for a component mesh; and interleaving the performing of one or more boundary edge collapses and the performing of one or more interior edge collapses based on the costs during simplification of the component mesh.

Supported aspects include the forgoing computer-implemented method, wherein performing a boundary edge collapse comprises collapsing vertices of a boundary edge into a resulting vertex at a position that is calculated independently of interior edges of the component mesh.

Supported aspects include any of the forgoing computer-implemented methods, wherein performing a boundary edge collapse comprises collapsing a boundary edge along a shared boundary between a component mesh and an adjacent component mesh into a resulting vertex at a position that is calculated based only on positions of vertices in the shared boundary.

Supported aspects include any of the forgoing computer-implemented methods, further comprising: preemptively determining that a subsequent edge collapse would cause the component mesh to become non-manifold; and inserting additional geometry into the component mesh to preserve manifoldness.

Supported aspects include any of the forgoing computer-implemented methods, further comprising: tracking an age of each vertex in the additional geometry.

Supported aspects include any of the forgoing computer-implemented methods, wherein a cost of performing a particular candidate edge collapse is calculated based on an age of at least one vertex in the additional geometry.

Supported aspects include any of the forgoing computer-implemented methods, further comprising: combining a simplified component mesh with an adjacent simplified component mesh along an identical simplified boundary.

Supported aspects further include an apparatus, a system, a computer-readable storage medium, and/or means for implementing and/or performing any of the foregoing computer-implemented methods or portions thereof.

Supported aspects include a computer-readable storage medium storing computer-executable instructions that, when executed by a processor of a computing device, cause the computing device to perform mesh simplification operations comprising: calculating costs of performing candidate edge collapses for a component mesh representing a portion of a three-dimensional model surface, the candidate edge collapses including boundary edge collapses and interior edge collapses, wherein a cost of performing a boundary edge collapse is calculated based on a position of a resulting vertex of the boundary edge collapse, and the position of the resulting vertex is determined independently of positions of vertices that form interior edges of the component mesh; and interleaving execution of boundary edge collapses and execution interior edge collapses based the costs of performing the candidate edge collapses to simplify the component mesh.

Supported aspects include the foregoing computer-readable storage medium, wherein the mesh simplification operations further comprise: preemptively determining that a subsequent edge collapse would cause the component mesh to become non-manifold; and inserting at least one additional vertex and accompanying new faces into the component mesh to preserve manifoldness.

Supported aspects include any of the foregoing computer-readable storage media, wherein the mesh simplification operations further comprise: assigning a weighting factor to the at least one additional vertex; calculating a cost of collapsing a new edge formed by the at least one additional vertex based on the weighting factor; and collapsing the new edge before collapsing edges formed by original vertices of the component mesh.

Supported aspects further include an apparatus, a system, a computer-implemented method, and/or means for implementing any of the foregoing a computer-readable storage media or portions thereof.

Supported aspects of parallel mesh simplification can provide various attendant and/or technical advantages in terms of improved efficiency and/or savings with respect to power consumption, memory processor cycles, and/or other computationally-expensive resources. By way of illustration and not limitation, supported aspects allow boundaries of adjacent component meshes to simplify identically. As a result, the need to apply a post-processing algorithm to reconcile boundary differences and the artifacts that result from performing post processing can be avoided. Simplifying the boundary of a component mesh also results in fewer triangles as compared to leaving the boundary of unsimplified. In addition, the interleaving of boundary edge collapses and interior edge collapses further reduces the number of unnecessary triangles yields smoother combined meshes around their boundaries.

Supported aspects allow component meshes to be simplified in parallel and independently of each another. As a result, the need to synchronize component meshes and inter-process communication can be avoided during the simplification of a component mesh. In addition, parallel mesh simplification operations can be performed on different component meshes at different times and/or on different computers.

Supported aspects allow a boundary of a component meshes to be simplified independently of the interior of the component mesh. As a result, the use of interior information and the boundary differences that result from using interior information can be avoided. In addition, the boundary edge collapse function does not use a weighting coefficient for a distance to the boundary plane and, therefore, is not prone to the errors that can be encountered when the weighting coefficient is too large or too small.

Supported aspects allow the consistency of a particular boundary that is shared by adjacent component meshes to be maintained using only boundary information pertaining to the particular boundary. As a result, the particular boundary can be simplified independently of other boundaries of the adjacent component mesh and will simplify identically when the adjacent component meshes are simplified.

Supported aspects detect and address edge collapses that could result a component mesh becoming non-manifold. As a result, the manifoldness of a component mesh can be preserved when the component mesh is simplified. In addition, when geometry is inserted into a component mesh to preserve manifoldness, edges formed from newly added vertices can be collapsed without interference from newly added vertices and before edges formed from original vertices. As a result, a simplified component mesh will retain more features of the original mesh.

The detailed description provided above in connection with the appended drawings is intended as a description of examples and is not intended to represent the only forms in which the present examples can be constructed or utilized.

It is to be understood that the configurations and/or approaches described herein are exemplary in nature, and that the described embodiments, implementations and/or examples are not to be considered in a limiting sense, because numerous variations are possible. The specific processes or methods described herein can represent one or more of any number of processing strategies. As such, various operations illustrated and/or described can be performed in the sequence illustrated and/or described, in other sequences, in parallel, or omitted. Likewise, the order of the above-described processes can be changed.

Although the subject matter has been described in language specific to structural features and/or methodological acts, it is to be understood that the subject matter defined in the appended claims is not necessarily limited to the specific features or acts described above. Rather, the specific features and acts described above are presented as example forms of implementing the claims.

What is claimed is:

1. A computing device for performing mesh simplification, the computing device comprising:
   a processor configured to execute computer-executable instructions; and
   memory storing computer-executable instructions that, when executed by the processor, cause the computing device to:
   decompose an input mesh representing a three-dimensional model surface into a plurality of component meshes, each component mesh comprising at least one boundary edge shared with another component mesh and at least one interior edge not shared with another component mesh; and
   simplify each component mesh by performing a plurality of boundary edge collapses and a plurality of interior edge collapses;
   wherein performing each boundary edge collapse comprises collapsing vertices of a boundary edge into a resulting vertex at a position that minimizes the sum of distances to respective planes and to a boundary plane, each respective plane containing a respective edge formed by one of the vertices of the boundary edge and further containing a vector that is perpendicular to the boundary plane.

2. The computing device of claim 1, wherein performing a boundary edge collapse comprises collapsing vertices of a boundary edge into a resulting vertex at a position that is calculated independently of positions of vertices that form interior edges of the component mesh.

3. The computing device of claim 1, wherein performing a boundary edge collapse comprises collapsing a boundary edge along a shared boundary between a component mesh and an adjacent component mesh into a resulting vertex at a position that is calculated based only on positions of vertices that form boundary edges in the shared boundary.

4. The computing device of claim 1, wherein simplification of the component mesh produces a simplified component mesh having a boundary that is identical to a boundary of an adjacent simplified component mesh.

5. The computing device of claim 1, wherein a cost of performing the boundary edge collapse is calculated based on distances from the position of the resulting vertex to the respective planes and to the boundary plane.

6. The computing device of claim 1, wherein the memory further stores computer-executable instructions that, when executed by the processor, cause the computing device to:
   verify in advance of performing a particular edge collapse that the component mesh would remain manifold if the particular edge collapse was performed.

7. The computing device of claim 6, wherein the memory further stores computer-executable instructions that, when executed by the processor, cause the computing device to:
   insert additional geometry into the component mesh to preserve manifoldness if the particular edge collapse would cause the component mesh to become non-manifold.

8. The computing device of claim 7, wherein the memory further stores computer-executable instructions that, when executed by the processor, cause the computing device to:
track an age of each vertex in the additional geometry.

9. The computing device of claim 8, wherein a cost of performing a particular candidate edge collapse is calculated based on an age of at least one vertex in the additional geometry.

10. A computer-implemented method for mesh simplification, the computer-implemented method comprising:
decomposing an input mesh representing a three-dimensional model surface into a plurality of component meshes, each component mesh comprising at least one boundary edge shared with another component mesh and at least one interior edge not shared with another component mesh; and
simplifying each component mesh by performing boundary edge collapses and interior edge collapses for a component mesh;
wherein the performing boundary edge collapses comprises collapsing vertices of a boundary edge into a resulting vertex at a position that minimizes the sum of distances to respective planes and to a boundary plane, each respective plane containing a respective edge formed by one of the vertices of the boundary edge and further containing a vector that is perpendicular to the boundary plane.

11. The computer-implemented method of claim 10, wherein performing a boundary edge collapse comprises collapsing vertices of a boundary edge into a resulting vertex at a position that is calculated independently of interior edges of the component mesh.

12. The computer-implemented method of claim 10, wherein performing a boundary edge collapse comprises collapsing a boundary edge along a shared boundary between a component mesh and an adjacent component mesh into a resulting vertex at a position that is calculated based only on positions of vertices in the shared boundary.

13. The computer-implemented method of claim 10, further comprising:
preemptively determining that a subsequent edge collapse would cause the component mesh to become non-manifold; and
inserting additional geometry into the component mesh to preserve manifoldness.

14. The computer-implemented method of claim 13, further comprising: tracking an age of each vertex in the additional geometry.

15. The computer-implemented method of claim 14, wherein a cost of performing a particular candidate edge collapse is calculated based on an age of at least one vertex in the additional geometry.

16. The computer-implemented method of claim 10, further comprising: combining a simplified component mesh with an adjacent simplified component mesh along an identical simplified boundary.

17. A computer-readable storage medium storing computer-executable instructions that, when executed by a processor of a computing device, cause the computing device to perform mesh simplification operations comprising:
decomposing an input mesh representing a three-dimensional model surface into a plurality of component meshes, each component mesh comprising at least one boundary edge shared with another component mesh and at least one interior edge not shared with another component mesh;
simplifying each component mesh by performing a plurality of boundary edge collapses and interior edge collapses
wherein the performing each boundary edge collapse comprises collapsing vertices of a boundary edge into a resulting vertex at a position that minimizes the sum of distances to respective planes and to a boundary plane, each respective plane containing a respective edge formed by one of the vertices of the boundary edge and further containing a vector that is perpendicular to the boundary plane.

18. The computer-readable storage medium of claim 17, wherein the mesh simplification operations further comprise:
preemptively determining that a subsequent edge collapse would cause the component mesh to become non-manifold; and
inserting at least one additional vertex and accompanying new faces into the component mesh to preserve manifoldness.

19. The computer-readable storage medium of claim 18, wherein the mesh simplification operations further comprise:
assigning a weighting factor to the at least one additional vertex;
calculating a cost of collapsing a new edge formed by the at least one additional vertex based on the weighting factor; and
collapsing the new edge before collapsing edges formed by original vertices of the component mesh.

* * * * *